US008364183B2

United States Patent
Olincy et al.

(10) Patent No.: US 8,364,183 B2
(45) Date of Patent: Jan. 29, 2013

(54) "I AM DRIVING/BUSY" AUTOMATIC RESPONSE SYSTEM FOR MOBILE PHONES

(76) Inventors: Julia Olincy, Dallas, TX (US); Ronald C. Fish, Los Gatos, CA (US)

( * ) Notice: Subject to any disclaimer, the term of this patent is extended or adjusted under 35 U.S.C. 154(b) by 0 days.

(21) Appl. No.: 13/373,325

(22) Filed: Nov. 10, 2011

(65) Prior Publication Data
US 2012/0058750 A1 Mar. 8, 2012

Related U.S. Application Data

(62) Division of application No. 12/653,988, filed on Dec. 21, 2009.

(51) Int. Cl.
*H04W 4/00* (2009.01)

(52) U.S. Cl. ............ 455/466; 455/413; 455/414.1; 455/418; 455/415; 379/80; 379/88.01; 379/360

(58) Field of Classification Search .......... 455/413, 455/414.1, 418, 466, 412.1, 415; 379/80, 379/88.01, 360
See application file for complete search history.

(56) References Cited

U.S. PATENT DOCUMENTS

| | | | | |
|---|---|---|---|---|
| 5,153,826 A | * | 10/1992 | Johnson | 700/91 |
| 7,096,010 B2 | * | 8/2006 | Phillips | 455/418 |
| 7,369,864 B2 | * | 5/2008 | Vaananen | 455/466 |
| 2002/0065069 A1 | * | 5/2002 | Phillips | 455/419 |
| 2003/0216138 A1 | * | 11/2003 | Higuchi et al. | 455/412.1 |
| 2006/0015812 A1 | * | 1/2006 | Cunningham et al. | 715/535 |
| 2008/0299949 A1 | * | 12/2008 | Higuchi et al. | 455/412.2 |
| 2010/0330966 A1 | * | 12/2010 | Higuchi et al. | 455/412.2 |

FOREIGN PATENT DOCUMENTS
KR  1020040070712  * 9/2004

* cited by examiner

*Primary Examiner* — Joseph Arevalo
(74) *Attorney, Agent, or Firm* — Ronald C. Fish

(57) ABSTRACT

A cell phone which has been modified by the addition of software which responds to the press of one or more Busy keys by automatically sending a pre-typed text message to the sender of the latest text message just received or automatically answering an incoming call immediately upon pressing the Busy key and playing a pre-recorded audio message. The outgoing text or audio message can inform the sender of the incoming text or the caller that the user is driving or otherwise engaged and cannot respond immediately. In some embodiments, one or more Busy keys can be added keys or one or more existing keys on the cell phone or on the keypad of the cell phone or on a touchscreen or a visual depiction of a keypad on a touchscreen of the cell phone.

5 Claims, 11 Drawing Sheets

FIG. 2 BLACKBERRY™ BOLD EXAMPLE

SOFTWARE LAYERS IN MODIFIED SMARTPHONE

"I AM DRIVING/BUSY" AUTOMATIC RESPONSE SYSTEM FOR MOBILE PHONES

BACKGROUND OF THE INVENTION

This is a divisional of prior U.S. patent application Ser. No. 12/653,988, filed Dec. 21, 2009 which is currently co-pending (now allowed). This case is also related to the following co-pending United States patent applications: Ser. No. 12/658,449, filed Feb. 8, 2010; Ser. No. 12/803,282; Ser. No. 13/373,326, filed Nov. 10, 2011; Ser. No. 13/373,323, filed Nov. 10, 2011. Recent studies have shown that driving while texting on a cell phone is more dangerous than driving while intoxicated. Older studies have linked higher traffic accident rates to talking on cell phones while driving.

However, some people use their cell phones for business and do not want clients or customers to wonder why they did not call back right away. Other people just want to be able to respond promptly in some fashion without endangering themselves or others so the person calling them or texting them knows what is going on or does not start to worry since the person normally responds right away to a text or phone call.

An article in a Nov. 22, 2009 Dallas newspaper described a subscription system called ZoomSafer™ that renders driving when a cell phone is present safer. The system uses the GPS on the phone to detect when the user is driving and then disables the cell phone until the driver stops the car. This system is believed to shut off the user's phone while the user is driving. The problem with such a system is that the user may wish to know who is calling or texting, and if the call or text is important enough, pull over, stop the car and answer the text or call.

Other companies such as GM assume that drivers' judgment can be trusted and they have implemented handsfree Onstar™ systems to voice dial numbers that have been previously stored and given a nametag by pushing the Onstar phone button and asking the user to speak the nametag. The system then automatically dials the phone number stored in the car's computer using a cell phone built into the car and minutes purchased from Onstar. GM has also implemented Bluetooth™ systems to dial the phone owned by the user by coupling the user's cell phone to the car's audio system and allowing the user to dial a number from a keypad displayed on the navigation system display of the vehicle or from the cell phone or cell phone address book. The audio of the call is played through the car's audio system and a microphone in the car picks up the driver's voice and couples it to the cell phone for transmission using the Bluetooth system. Ford and Microsoft are selling systems that rely on voice commands to dial phones. The systems that disable the cell phone using the GPS have caught the attention of the insurance companies because studies show that driving while talking on a cell phone is dangerous even if the driver is using a headset and has both hands on the wheel. One insurance company has said it will offer discounts to customers who use a call-blocking service to disable their phones. Other companies such as Aegis Mobility and obdEdge employ systems that place restrictions on phones based upon the phone's GPS signal, data from the car itself or from nearby cell towers. Any incoming calls are routed to voice mail or a message explaining that the phone's user is driving. Exceptions can be made for certain numbers. The exceptions are the only control the user of the cell phone has in these systems to allow a call to come through. This puts too much restriction on the driver to anticipate who might be calling and gives the driver no option to see the caller IDs of all incoming calls and decide whether or not to pull over and take the call or just take the call while driving and take the risk.

Another prior art feature found in some phones is called "Quick Text" and it features a menu from which the user can choose "canned" (already typed and stored in the phone) responses to send in response to a text message received. In a "Quick Text" capable phone, all the steps to reply to a text message must be done as they are normally done, but with a few extra keystrokes, the user can choose a message that has already been typed instead of having to type a reply message. That is, the user receives a notification that a text (SMS) message has arrived does a keystroke or two to select the text application program and select the text message to view, does a keystroke to put the phone into reply mode but then the user may do another keystroke to open a menu of canned messages to send as a reply. Typically, this is a keystroke to select an "Options" icon (give a command to open a menu which includes a command "Add Quick Text"). Then another keystroke is required to select the "Add Quick Text" command. This keystroke brings up a list of canned messages that can be selected and sent such as "thanks", "yes", "no", etc. One or more keystrokes or scrolling action or trackball action is then required to select the canned message to send and then another keystroke is required to put the canned message into the reply screen as the message to be sent. Then another keystroke is required to actually send the canned message just selected. That is quite a few keystrokes and requires too much attention to the phone, its display and its keypad. It would be too many keystrokes and diverted attention to do while driving and still drive safely.

There has therefore arisen a need for a simple, fast, safe way for the user of a cell phone who is driving to know who is calling or texting, and, with a single push of a button, send a pre-typed message to a text sender or a pre-recorded voice message to a caller who is calling in while the owner of a cell phone is driving or otherwise engaged if the driver chooses not to take the call or reply to the text while driving and chooses not to pull over and take the call or reply to the text.

DETAILED DESCRIPTION OF THE PREFERRED EMBODIMENT

Figure 1:
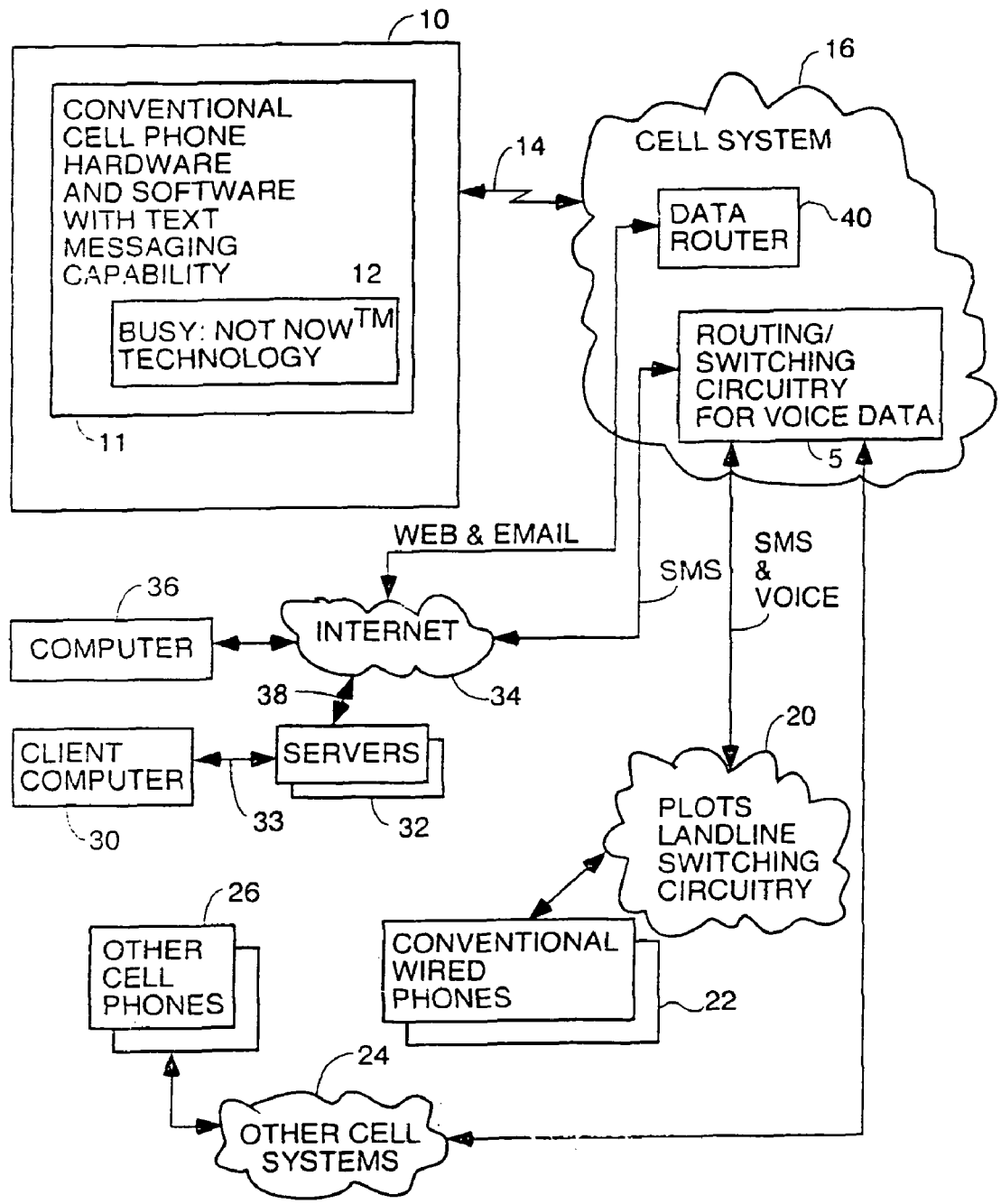
FIG. 1 is a block diagram of the environment in which the invention works and a block diagram of a broad concept of the invention.

A conventional cell phone, preferably one which displays the identity of a caller or text sender who is in the address book of the owner of the cell phone is modified to implement the teachings of the invention. The modification involves having either one or two new buttons on the phone or keypad (or one or two keystrokes of existing keys), hereafter sometimes referred to as Busy buttons, which can be pushed to automatically send a pre-typed text message and/or answer an incoming call and send a pre-recorded voice message to the caller if the Busy: Respond Later™ application has been launched and the user chooses not to immediately answer the text or phone call while driving or otherwise engaged. In some embodiments, the Busy: Respond Later™ application process might be launched manually by the user before he or she starts to drive, etc. In other embodiments, the Busy: Respond Later™ application process is automatically launched when the GPS of the phone senses the phone is moving at a speed faster than a user can walk. In other embodiments, the Busy: Respond Later™ application process is automatically launched when the phone is booted up. In the claims, the step of launching the Busy: Respond Later™ process is intended to cover at least all four of these embodiments for how the Busy: Respond Later™ process is launched.

The Busy: Respond Later™ button or buttons can either be a new button or buttons added to the phone or to the keypad of the phone, as is illustrated in the examples, or already existing buttons on the phone or keypad of the phone. In some embodiments, the outgoing message can be fixed such as "I am busy right now and will respond later". In other embodiments, the outgoing automated message (text or voice message) can be selected by the user during configuration of the Busy: Respond Later™ application from a number of different "canned" messages supplied by the manufacturer of the phone. In other embodiments, the outgoing message or messages is a message that the user types in and/or records using a voice notes application, if the phone has one. In other embodiments, the outgoing Busy: Respond Later™ message may be established by the user by importing an MP3 file recorded on another device into the phone or by downloading a text message or voice message or both types of messages from a ringtone service or some other service like a ringtone service from which text and voice messages for the Busy: Respond Later™ application may be downloaded for free or for a fee. In configurable message embodiments, the user can pick the message to be sent or played before they get in the car and start driving or go on vacation or start a meeting.

A single button, context sensitive embodiment, can be implemented in "hot key" embodiments with two pre-existing keys on the cell phone keypad which must be pushed simultaneously for the Busy: Respond Later™ technology to be triggered. When the Busy: Respond Later™ technology is triggered, it sends an automated response to the sender of a text or the caller of an incoming call informing them of the busy status of the user of the cell phone.

Similar embodiments are implemented for two button embodiments where one button is used to automatically respond to an SMS message and another button is pushed to automatically answer an incoming call and respond with an appropriate message. Either or both of these buttons can be added to the phone or the existing keypad or they can be existing keys on the phone or keypad or they can be existing keys on the phone or keypad which will trigger the automated response only if another "hot key" on the phone or keypad is pushed simultaneously. The hot key embodiments are not favored since to push two buttons on a cell phone simultaneously in a moving car would probably require both hands which would be dangerous. However, the hot key and the other key could be located next to each other such that one finger can push both simultaneously.

In some embodiments, one button (or a hot key and another button) is pushed to respond automatically to a text message just received with a pre-typed message, and another button is pushed to answer an incoming call and play a pre-recorded message to the caller. These embodiments involve in the case of an SMS message, automatically playing a macro (giving the appropriate series of commands) which makes the appropriate function calls to the operating system of the phone and/or application programmatic interface calls to the SMS application to do whatever is necessary to manipulate the SMS application. The series of functions performed by this "macro" are to: select the SMS message just received; put the SMS application in reply mode; put a pre-typed message in the keyboard buffer or wherever symbols typed from the keyboard are stored when an SMS message is composed; and give the operating system a send command to send the pre-typed message. In the case of an incoming phone call the Busy: Respond Later™ macro makes the appropriate function calls to the operating system to: answer an incoming call; retrieve a digitized voice message and send that data to the processor buffer where digitized data from the cell phone's microphone is stored; and send the data to the transceiver used to transmit voice data for a cell phone call: and automatically hang up the phone or route the call to voicemail.

In the preferred, context-sensitive embodiments, a single context-sensitive button is pushed (or a hot key and another button) which responds to a text message automatically if a text message has just been received or answers and incoming call and responds by playing a pre-recorded message.

In one push, non-hot-key embodiments, a text message is automatically responded to after one push of a newly added SMS button or key or one push of a pre-existing button or key with a pre-typed reply message that the owner of the phone is busy driving or otherwise engaged and cannot respond to a text message which has just been received.

In one push non-hot-key embodiments, an incoming phone call is responded to automatically with a single button push of a newly added Busy: Respond Later™ CALL button or key or a button or key which already exists on the phone or keyboard which causes the incoming call to be answered and a pre-recorded message played that informs the caller that the owner of the cell phone is busy and cannot speak with the caller at the moment.

The technology varies from phone to phone in terms of the type of software and the function calls made to manipulate the operating system, SMS application and phone call application which implements the Busy: Respond Later™ technology, referred to in the claims as an automated response application program. Basically, the Busy: Respond Later technology functions, when triggered, to do whatever is necessary on the host phone to give the appropriate commands to designate the text message to which an automated reply is being sent, select it and enter the reply mode, enter the pre-recorded text message and, finally, to automatically give the send command. In the case of an incoming phone call, the Busy: Respond Later technology, when triggered, makes whatever function calls are necessary to answer an incoming call automatically and play a pre-recorded message to the incoming caller and then hang up the phone or route it to voicemail. All processes which work for whatever phone the technology is implemented on are intended to be covered by the appended claims.

The message that is sent to respond to an incoming text just received or played to an incoming caller could be anything. "I am driving and cannot respond immediately" is one example.

FIG. 1 is a block diagram of the environment in which the teachings of the invention find, utility and a block diagram of a broad concept according to the appended claims defining a functionality which the inventors believe is novel and not obvious. A cell phone 10 which is capable of sending and receiving text messages has circuitry and software 11 which is conventional for sending and receiving text messages and making and receiving phone calls but which is modified with a Busy: Respond Later™ technology 12 which carries out functions according to the appended claims. The Busy: Respond Later™ technology 12 comprises a button or "key" on the cell phone or on the "keypad" or "keyboard" which can be pushed when the user of the cell phone is driving or otherwise busy and receives an incoming text message or phone call to which the user cannot or does not wish to respond to immediately.

The Busy: Respond Later technology 12 also comprises whatever circuitry and/or software which is necessary for the particular host cell phone to, in the case of an incoming text message: 1) receive the push of the Busy: Respond Later™ key; 2) select the text message which has just been received: 3) do whatever is necessary for the particular host cell phone in which the Busy: Respond Later™ technology is resident to put the cell phone in reply mode to reply to the text message just received; 4) do whatever is necessary for the particular host cell phone in which the Busy: Respond Later™ technology is resident to automatically enter characters of a reply text message that informs the sender of the text message that the recipient is busy and cannot respond immediately; and 5) do whatever is necessary for the particular host cell phone in which the Busy: Respond Later™ technology is resident to give the command to send the text message. Thus, a user of a cell phone can reply to an incoming text message automatically with a single push of a button, which can easily be accomplished while the user is driving or otherwise engaged and cannot respond to the text message just received safely or who simply does not wish to respond to the text message just received immediately. At least one example will be given below for specific cell phone technology.

In the case of an incoming phone call while the user of the cell phone is driving or otherwise does not wish to speak with the caller but wishes to tell the caller the user is busy and cannot speak with the caller at the moment, the Busy: Respond Later™ technology 12 comprises a button or "key" on the cell phone or on the "keypad" or "keyboard" of the cell phone which: 1) receives the push of the Busy: Respond Later™ key; 2) does whatever is necessary for the particular host cell phone in which the Busy: Respond Later™ technology is resident to answer the incoming phone call; 3) does whatever is necessary for the particular host cell phone in which the Busy: Respond Later™ technology is resident to play a pre-recorded message to the caller indicating that the user is driving or otherwise busy and cannot talk to the caller at the moment; and 4) does whatever is necessary for the particular host cell phone in which the Busy: Respond Later™ technology is resident to hang up the phone.

The terms "button," "key," "keypad" and "keyboard" in embodiments described herein include not only physical keys and keyboards such as are found on most cell phones such as the Blackberry™ smartphone but also on touch sensitive areas on the desktops or any display such as the display of the keyboard on touchscreen cell phones or smartphones such as the iPhone™.

There can be a single key for the Busy: Respond Later™ technology which is context sensitive and does whatever is necessary to respond to an incoming phone call or a text message which was just received, depending upon which was received, or there can be two keys, one to respond to text messages just received and one to respond to an incoming phone call.

A typical environment in which the teachings are employed is shown in FIG. 1. The cell phone 10 is coupled by radio frequencies carriers 14 to a conventional cell system 16 such as the Sprint cellular system. Cellular systems include transceivers that handle voice signals that have been converted to digital data and modulated onto an RF carrier which is routed by router 18 to landline switching circuitry for hardwired telephony, commonly referred to as plain old telephone service or POTS 20. The conventional telephony circuitry routes voice signals and/or digital data along a path to conventional wired phones 22. The router 18 also routes packets containing digitized voice data of conversations between cell phones to other cell systems (which can include the cell system of which phone 10 is resident) which sends the packet data on to the one of cell phone 26 which is at the other end of the conversation after modulating the data onto an RF carrier of the proper frequency and using the modulation scheme in use for voice conversations in the cell system 24.

It is possible for text messages to be sent to a cell phone from a computer. For example, client computer 30 coupled to server 32 via LAN 33 can send a text message to cell phone 10 via an Internet Service Provider 38, the internet 34 and data router 18 in cell system 16. Link 38 represents both an ISP and some sort of physical layer modem to connect the server 32 to the internet such as a UVERSE™ modem, cable modem, satellite service modem, POTS dial up modem, etc. Text messages from cell phone 10 are packetized and sent back via the SMS channel of the cell system 16 (part of the control channel used for call setup), data router 18, internet 34 and ISP 38, server 32 to client computer 30. Some computers 36 are coupled to the internet 34 directly and not through a LAN such as by a wireless broadband USB card, cell phone acting as a modem or any other type modem supplied by an Internet Service Provider (ISP) such as UVERSE™, Comcast, etc.

Details of how cellular systems work can be found in Macario, Raymon, "*Cellular Radio: Principles and Design*" (McGraw Hill 1997).

Text messages of the Short Message Service or SMS are methods of communication that send text between cell phones or from a PC to a cell phone. SMS messages are limited to 160 characters total. Even if a person is not talking on their cell phone, the phone is constantly sending and receiving information. It is talking to its cell phone tower over a data pathway called a control channel modulated onto a radio carrier. The reason for this chatter is so that the cell phone knows which cell your phone is in so that it can be found for incoming calls or texts and so that the cell phone can change cell towers as it moves around. Every so often, the phone and the tower exchange a packet of data that lets both of them know everything is in good working order and who is where in the cell system. This is called a handshake.

The cell phone also uses the control channel for call setup. When someone tries to call your phone, the cell tower sends your phone a message over the control channel telling your phone to play its ringtone. The tower in cell system 16 also gives your phone a pair of voice channel frequencies, one to transmit on and one to receive on, for full duplex communication. The control channel also provides the digital data pathway for SMS messages and router 18 which routes packets of digitized voice data and also routes packets of SMS data. Internet web browsing and e-mail are different digital data pathways that are separate from the data pathways used to send and receive digitized voice data and SMS messages. Data router 40 is actually in the web and e-mail data pathway of the cell system 16 and is used by the cell phone 10 to send and receive e-mail messages and to browse the worldwide web.

The cell system has a core network which includes a centralized SMSC (Short Message Switching Control—symbolized by router 18 in FIG. 1). When somebody sends a text message, the text message is packetized into a data packet which is modulated onto a radio carrier and sent as data on the control channel. The text message packet or packets flow to the cell system tower in which the sender phone resides, then to the centralized SMSC symbolized by router 18. In some embodiments (not shown), the SMSC is a separate routing and switching system separate from the routing and switching system which handles voice call data. From the SMSC, the text message is routed to the cell tower in which the recipient phone resides and sent out to the phone on that tower's control channel. The actual format of the SMS packets includes things like the length of the message, a time stamp, the destination phone number, the format, etc.

Figure 2:
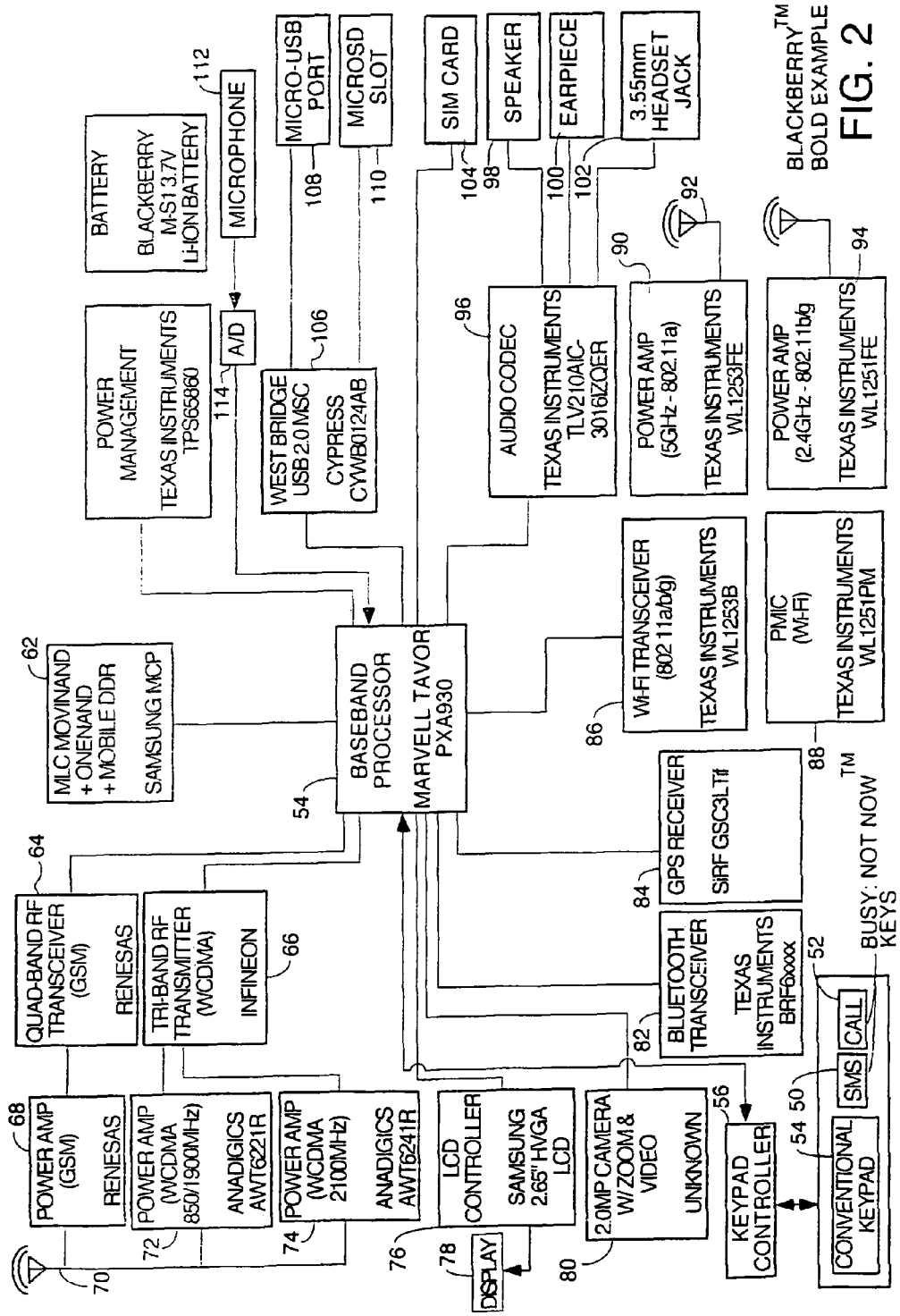
FIG. 2 is a block diagram of an example along the lines of the teachings of the invention in the form of a Blackberry™ Bold smartphone that has been modified to add two Busy: Respond Later™ keys 50 for SMS and 52 for a Call to the hardware.

FIG. 2 is a block diagram of an example along the lines of the teachings of the invention in the form of a Blackberry™ Bold smartphone that has been modified to add two Busy: Respond Later™ keys 50 (SMS) and 52 (Call) to the already existing keyboard 54 of the phone or two Busy: Respond Later™ touchscreen areas to the display on a touchscreen phone such as the iPhone™. The Busy keys 50 and 52 can also be placed anywhere else on the phone such as the sides, top or bottom of the phone so that they can be easily found by feel without looking at the keypad or keyboard. The smartphones and all other modern cell phones have a software stack architecture (to be described further below) starting with an operating system or kernel which controls processing by the microprocessor 54. Key pushes are detected by the keypad controller 56 and sent to the microprocessor 54. Modifications (not shown) to the software that controls processor 54 to implement the Busy: Respond Later™ functionality will be described below. In other embodiments, the two Busy keys 50 and 52 represent keys on the conventional keypad 54 which are reprogrammed to trigger the Busy: Respond Later™ function when pressed when an incoming text just arrived or when an incoming call is arriving. These can be single key pushes of, for example, the space bar when an incoming text has just been received or a single push of the shift or symbol key when an incoming call is arriving. The software senses the context and assumes a push of the spacebar right as the first thing that happens after a text was received means the Busy: Respond Later™ auto message is to be sent to the sender of that text just received. Likewise, the software assumes that a push of the shift or symbol key while an incoming phone call is ringing means the Busy: Respond Later™ message should be sent to the caller since there would be no other reason to push that key in that situation since it has nothing to do with answering the call or diverting it to voicemail in the absence of the Busy: Respond Later™ functionality.

In the embodiment of FIG. 2 one Busy key 50 (SMS) is pushed to automatically reply to an SMS text message just received and a second Busy key 52 (CALL) is pushed to automatically answer an incoming phone call before it goes to voicemail and play a pre-recorded message that the user of the cell phone is driving or otherwise engaged and cannot speak to the caller at the moment. In some embodiments, the outgoing voice message can be played and then the phone is diverted directly into voicemail such as happens when the ignore button is pushed on a Blackberry™ or iPhone™ when another call comes in while the user is talking on a first call.

Those skilled in the art appreciate how the hardware of the phone works so only brief explanation will be given here. Power is supplied by li-ion rechargeable battery 58 and a power management circuit 60 controls the charging of the battery and reporting its status. Circuit 62 is fusion flash nonvolatile memory and volatile dynamic random access RAM memory manufactured by Samsung. A quad band transceiver 64 implements GSM protocol RF transmission and reception so the phone can be used in GSM systems here and abroad for phone calls. A tri-band RF transceiver 66 does the transmitting and receiving of RF carriers modulated with digital data packets for web browsing, e-mail, etc. These transceivers receive transmit data from processor 54 and send received data to it.

Power amplifier 68 amplifies RF carriers modulated with GSM protocol voice data and is coupled to antenna 70. Power amplifiers 72 and 74 amplify transmitted and received RF carrier signals modulated by code division multiple access (CDMA) data for browsing, e-mail etc.

LCD controller 76 allows processor 54 to control the phone's display 78.

Still photograph camera and video camera 80 receives commands from processor 54 to snap pictures or take video and sends the captured photo or video data to processor 54.

Bluetooth transceiver 82 couples processor 54 to external devices such as car phone systems or Bluetooth headsets to allow phone calls to be heard through the car audio or a wireless external headset.

GPS receiver 84 receives GPS signals, determines the phone's position and sends that data to processor 54.

802.11 a/b/g transceiver 86 allows the phone to couple wirelessly to the internet as a client computer through other than the cell system's data path. PMIC wi-fi circuit 88 manages power for the wi-fi access process. Power amplifier 90 couples the wi-fi RF signals from wi-fi transceiver 86 to antenna 92 for 802.11a protocol signals in the 5 GHz band, and power amp 94 couples wi-fi 2.4 GHz RF signals from wi-fi transceiver 86 in the 801.11 b/g protocol.

The audio of phone calls and other audio from movies being played back is converted from digital to analog by Codec 96 and coupled to speaker 98, earpiece 100 and headphone jack 102.

SIM card 104 stores all the phones contacts and settings and identifies the user and the user's account. It works only with GSM phones such as the iPhone and Blackberry and not with CDMA phones from Sprint or Verizon.

Controller chip 106 establishes a USB 2.0 interface for a micro-USB port 108 on the phone so that data and photos can be uploaded from the phone to a computer and for a Micro SD slot 110 so that an auxiliary memory card can be inserted in the phone.

Microphone 112 and analog-to-digital converter 114 convert voice sound waves to analog signals and analog signals to digital data for processor 54 to use in phone calls, recording voice notes, taking movies, etc.

Figure 3:
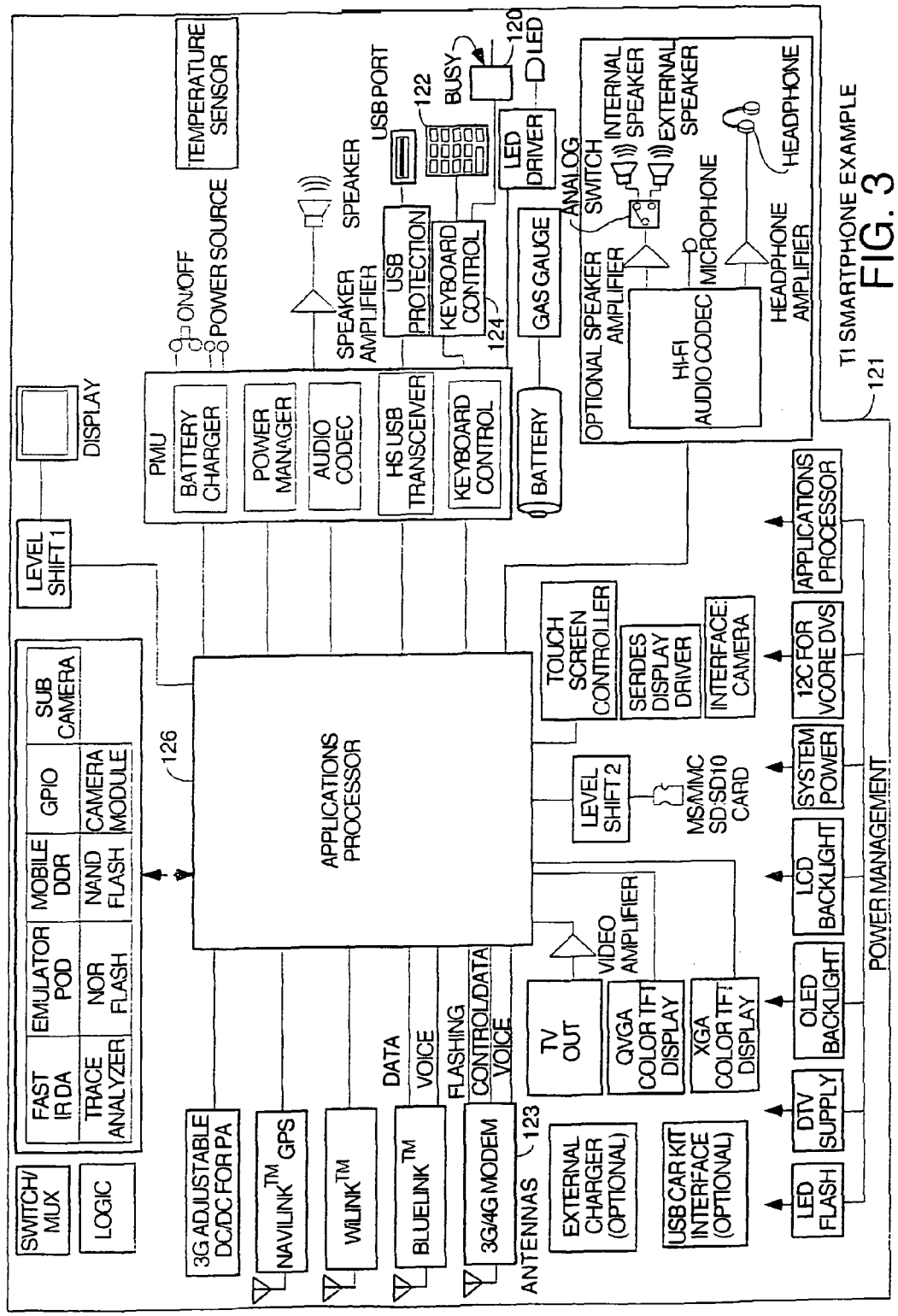
FIG. 3 is a block diagram of another smartphone which has a single, context-sensitive key that has either been added to the existing keypad and read by keypad controller or which is an existing key on the keypad which is read by the kernel software through a keyboard driver.

FIG. 3 is a block diagram of another smartphone which has a single, context-sensitive Busy key 120 that has either been added to the existing keypad 122 and read by keypad controller 124 or which is an existing key on the keypad 122 which is read by the software through controller 124. The Busy key 120 can also be placed anywhere else on the phone such as the sides, top or bottom of the phone so that they can be easily found by feel without looking at the keyboard. In any of these embodiments, the key is read in a context sensitive way so as to trigger a Busy: Respond Later™ function when it is pushed after a text message has been received or when an incoming call is arriving. All other hardware of the phone is conventional and will not be explained in great detail here since its structure and operation is familiar to those skilled in the art. Microprocessor 126 is controlled by a software architecture to be explained below comprised of an operating system, various drivers and application programs as was the case for the smartphone example of FIG. 2. The 3G/4G modem interfaces the smartphone 121 to the data router 40 (FIG. 1) of the cell system 16 (FIG. 1) and to the internet. This circuit implements a network protocol which is intended for multimedia smartphones and features increased bandwidth and transfer rates to accommodate web-based applications and phone-based audio and video files. 3G modems can implement one of several cellular access technologies: CDMA 2000 which is based upon 2G or second generation Code Division Multiple Access modulation of RF carriers with data packets; WCDMA which stands for Wideband Code Division Multiple Access; and TD-SCDMA which stands for Time Division Synchronous Code Division Multiple Access. 3G networks have potential transfer speeds up to 3 Mbps (about 15 seconds to download a 3-minute MP2 song). For comparison, the fastest 2G phones can achieve 144 Kbps. 3G phones are like mini laptops and can support video conferencing, receiving streaming video from the internet, sending and receiving faxes and instantly downloading e-mail with attachments. 4G protocols are even faster and they are being deployed now.

General Packet Radio Services (GPRS) is an older wireless network data transfer protocol for smartphones that is a packet based communication service. It is a 2.5G protocol that was the standard till recently. It is a packet-switched, always-on connection that remains active as long as the phone is within range of a tower. It allows the smartphone to do things like run applications remotely over the network, interface with the internet, participate in instant messenger sessions, act as a wireless modem for a computer and transmit and receive e-mails. It is limited to 114 kilobytes per second, so it has been replaced by Enhanced Data GSM Environment (EDGE) protocols which can transmit at 384 kbps, but it is still a 2.5G protocol. 3G protocols transmit data in megabits per second (some as fast as 10 Mbps) and are taking over. Some US carriers such as Sprint™ offer 3G protocols (EVDO). NTT DoCoMo Inc. tested a 4G protocol Feb. 9, 2007 that is 500 times faster than 3G protocols, and those protocols will eventually take over. The teachings of the invention may be employed in all these protocols.

The Modified Software Stack Architecture

Figure 4:
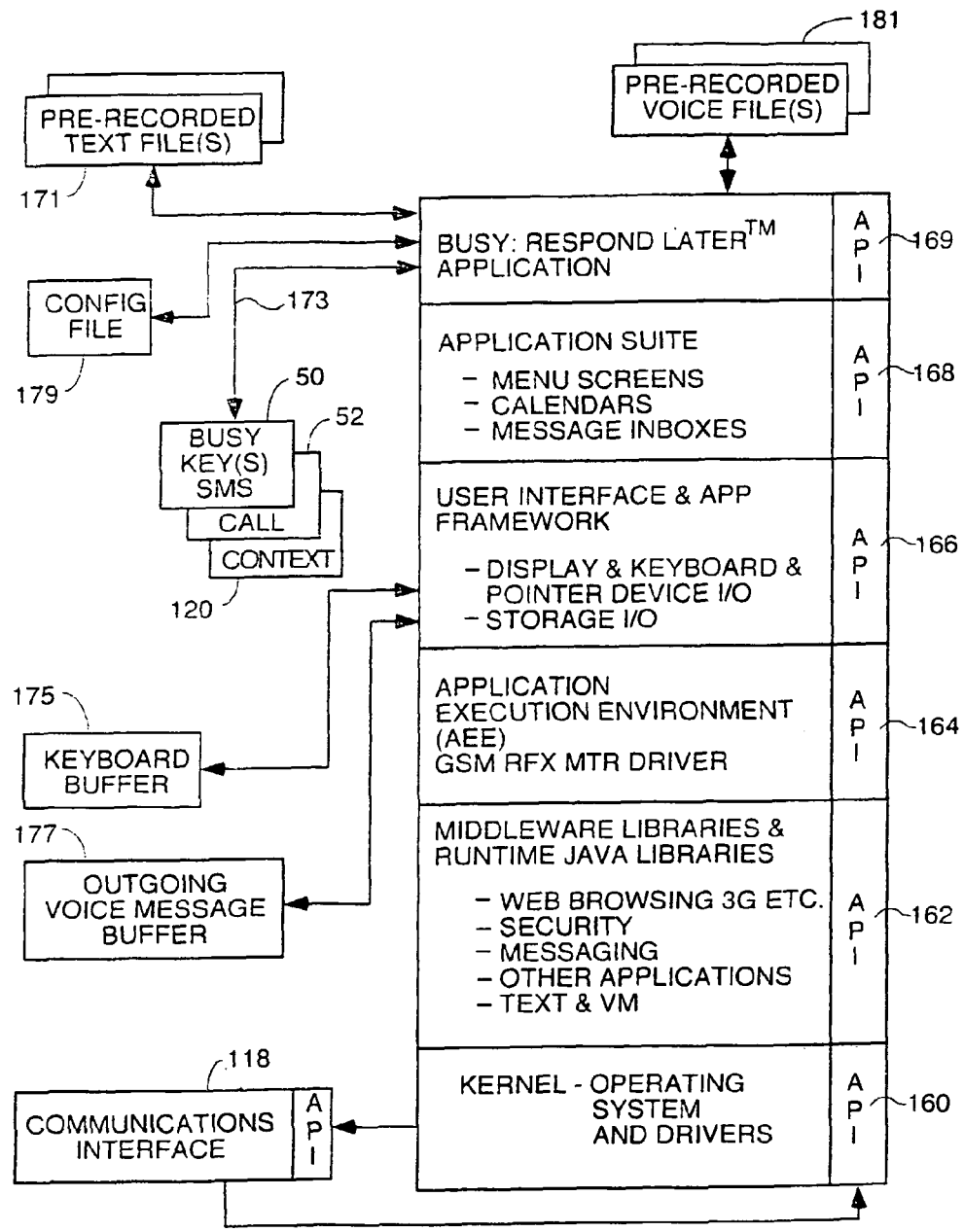
FIG. 4 is a diagram of the modified software stack architecture of a typical smartphone to which the Busy: Respond Later™ application has been added.

FIG. 4 is a diagram of the modified software stack architecture of a typical smartphone to which the Busy: Respond Later™ application has been added.

The typical software of a smartphone can be visualized as a stack. At each layer of the stack there are programs and application programmatic interfaces or APIs. APIs provide access to functions of a program invoked through its API without the programmer of the calling program needing to know the details of the structure and operation of the called program.

At the lowest level is the kernel 160. The kernel is the operating system which implements management systems for processes and some drivers for hardware. The kernel of a cell phone, among other things, manages the hardware circuitry and software resources for the keyboard, the display screen or touchscreen, the address book, the phone dialer, the battery and the network connection. The operating system provides a stable, consistent interface for application programs on the application layer 168 including the Busy: Respond Later™ application 169 to deal with the hardware of the smartphone without having to know the hardware circuitry of the particular smartphone upon which the application is resident.

To the extent power on self test code and BIOS code are used in cell phone operating systems as they are in desktop computers, the kernel implements these functions as code stored in nonvolatile memory such as ROM or FLASH memory. A bootstrap loader code section may also be stored in nonvolatile memory and functions to load the kernel or operating system into memory of the phone to take over further processing, set up divisions of memory that hold the operating system, user information and applications and it establishes data structures to hold the myriad of signals, flags and semaphores needed to communicate within and between the subsystems and applications of the computer. Finally, it turns control over to the operating system kernel 160 which, inter alia, performs processor management, memory management, device management, storage management, application programmatic interface and user interface functions. These functions of the kernel also allow the user of the phone to multitask and run more than one application at a time. When an application like the Busy: Respond™ application is running, it may cause several other processes to launch simultaneously such as launching the text messaging function (possibly on layer 162 or possibly one of the functions of the kernel 160—the layer is not important) and memory access or storage I/O process to retrieve the configuration file data, if a configuration file is used, and to retrieve the pre-typed text message designated to be sent when the Busy key (SMS) 50 or Busy key (Context Sensitive) 120 is pushed. The Busy: Respond Later™ application is a process in the operating system sense of the word meaning it is software that performs the designated action and it can be controlled by the user, other application or by the operating system. The kernel 160 schedules processor time for the Busy: Respond Later™ application and suspends it when necessary to run other processes or handle interrupts. Interrupts are signals sent to the processor by hardware or software to cause the kernel to handle some need of the sender of the interrupt. To allow multiple processes to appear to run on the phone simultaneously, the kernel switches between different processes thousands of times per second. Each process uses a certain amount of RAM, and uses registers, stacks and queues within the processor and operating system memory to do its process. The kernel allocates a certain number of processor cycles to the process. When those cycles are expended, the kernel switches processes by allocating a certain number of processor cycles to the new process, making a copy of all the registers, stacks, flags and queues used by the process being suspended (process #1) and noting the point in process #1 where execution was suspended (making a copy of the program counter). Process #2 is then started by loading the registers, stacks, queues, flags previously stored for process #2 and setting the program counter at the count at which it was suspended when process #2 was last suspended. After process #2 completes its allocated number of processor cycles, its registers, stacks, queues, flags and program count are copied and the process #1 is restored by bringing the copies of the registers, stacks, queues, flags and program count back into the appropriate registers and memory locations. Each process has a process control block with an ID for the process, pointers to the locations in the program and its data where processing last occurred, register contents, states of various flags and switches, pointers to the upper and lower bounds in memory required for the process, a list of fifes opened by the process, a priority of the process and the status of all input/output devices needed by the process.

Each process has a status associated with it. Many processes consume no processor time until they get some sort of input such as a keystroke from the user. The Busy: Respond Later™ application is an example of such a process. Until the Busy key is pushed, the Busy: Respond Later™ application 169 does not do anything. While it is waiting, it is "suspended" and all the information in the process control block for the Busy: Respond Later™ application's process is maintained. The process control block may be created in some embodiments, when the Busy: Respond Later™ application is launched just before the driver starts driving or attending a meeting that is not to be interrupted. In other embodiments, the Busy: Respond Later™ application does not launch until the Busy key is pushed.

The kernel also does memory management by setting up memory boundaries for each process and using the various types of memory such as cache, RAM, virtual memory and nonvolatile memory such as flash or disk drives (if present).

Drivers on the various layers like layer 166 are programs that act as translators between the electrical signals of the circuitry in the phone such as the keyboard and display and the high level programming instructions of the operating system. Drivers take data that the kernel 160 has defined as a file and translates the data into streams of bits stored in specific locations on storage devices as a series of laser pulses in a printer. In the case of the Busy: Respond Later™ application a driver program in layer 166 takes the pre-recorded text file 171 to be sent when the Busy key (SMS) 50 or Busy key (Context Sensitive) 120 is pushed and places it in the keyboard buffer 175 when the Busy: Respond Later™ application sends API function calls to the kernel asking it to activate the text messaging application and send a text message. The keyboard buffer 175 is used by the operating system to feed characters to the text messaging packetization process when that process is activated. The characters of the pre-recorded text message are then fed into the text message packetization process from the keyboard buffer 175 under command of the operating system as fast as the text message packetization process can handle the characters and when it needs them. The text message packetization process builds a control packet having the pre-recorded text message therein and sends it. More details of this will be explained below.

The operating system kernel 160 can be anything such as the operating systems provided by Research in Motion for the Blackberry™ smartphone, Windows Mobile™, the iPhone™ operating system, the Palm™ operating system for any of its smartphones or, preferably, the open source operating system Android™ for the Google smartphone. The operating system controls the hardware circuitry shown in block diagrams of FIGS. 2 and 3 and the hardware could also be the Google smartphone circuitry commercially available from High Tech Computer Corporation (HTC) from Taiwan and known as the HTC G1™ smartphone. The Android operating system is open source though and is designed to support phones made by different manufactures unlike the iPhone operating system which is exclusive to the hardware of the iPhone™. Because the Android™ operating system is open source, its source code is available to any developer who wishes to create an application for the phone. The Android operating system supports the hardware (not shown) of the HTC G1 smartphone which includes a microprocessor (Qualcomm 7201) coupled to a 3.2 inch LCD touchscreen (which slides aside to expose a full QWERTY keyboard), a GPS transceiver, 192 megabytes of random access memory, an accelerometer, an electronic compass, a 3.2 megapixel camera and WiFi and 3G connectivity circuitry (transmitters, power amplifiers, drivers, protocol layers to do packetization, etc.). There is also a memory storage card expansion slot. A USB adapter provides headphone support. The Android operating system was built using the Linux version 2.6 operating system. The Android kernel includes: memory management programs; security settings; power management software and several hardware drivers. A driver is software that allows the operating system to control a circuit. For example, the Android camera driver allows the user to send commands to the camera such as take a photo, store the photo, delete the photo, display the photo, etc.

At the next level up in the software architecture of FIG. 4 is the middleware libraries 162 which is a collection of software libraries that provide the functionality of the smartphone such as security, web browsing, PDA functions, messaging, calculator, calendar, still and video pictures, etc. As mentioned above, some of these functions are built into the operating system kernel in the preferred embodiments where the kernel 160 is the Android operating system.

The libraries of software layer 162 are sets of instructions that control the smartphone operating system, microprocessor and other hardware to handle different kinds of data. For example, the media framework library contains instructions controlling how the operating system controls the hardware of the phone to support playback and recording of various audio, video and picture formats. Think of the libraries as specialists in specific tasks and the operating system as a generalist that knows how to control the hardware assets of the phone to carry out the instructions given by the specialist library. There is likely to be a library to handle text messaging and a library to handle phone functions such as answer a call, play a voicemail message, hang up the call, answer an incoming call or ignore an incoming call during an ongoing call, etc. These text and phone functions may be incorporated into the kernel 160 in some embodiments since they are so much an intrinsic part of what every cell phone does and not special add on functions such as video recording, audio recording, audio playback and web browsing. Web browsing is usually a library and not built into the operating system in most embodiments.

The middleware libraries use the hardware circuits of the phone to accomplish their functions by making Application Programmatic Interface (API) function calls to the kernel 160. For example, a web browser application can request a web page by making an appropriate function call to the kernel commanding it to address the data communication interface circuitry and cause it to transmit out to the internet a Uniform Resource Locator (URL) passed to the kernel with the API function call. Each library of the middleware layer itself has an API which allows the kernel to call the middleware library and pass it commands or data received from other circuits in the cell phone.

The next level up in the stack or even at the same layer as the middleware libraries is the Application Execution Environment (AEE) 164 is a layer of tools which allows developers to create their own programs. In the Android operating system, AEE layer 164 is at the same layer as the middleware libraries 162 and comprises a set of core JAVA libraries that Android application program developers use to develop application programs for the phone. Application programs for the phone are like the software programs you use on your computer to do specific things like recording voice memos, browse the Internet, send and receive e-mail, send and receive text messages. On some cell phones such as the Blackberry™ or iPhone™ smartphones, applications do things like GPS navigation, finding the closest parking structure or restaurant, remembering where you parked your car and pointing it out on a Google map, etc. Some of these functions like GPS navigation, etc. may also be on the application layer 168. Basically, functions of the phone may be put on various layers such as the application layer or middleware library layer, but some are more appropriate for certain layers rather than others. It does not matter for purposes of the invention which layer upon which specific functions needed for the various embodiments are implemented. The particular layer a function is on is not at this time thought to be critical to the invention. For example, texting may be on the application layer 168, in the kernel 160, in the middleware libraries 162 or the runtime Java libraries.

The AEE layer 164 may include the GSM radio frequency transmitter driver or CDMA radio frequency transmitter driver also in some embodiments although that function may also be incorporated into the kernel or other layers. Generally functions that may be improved or altered or which processes (2.5G to 3G for example) are implemented separately from the kernel so that when changes or improvements are made, the entire operating system does not have to be propagated again with the changes to all the machines which use it. These RF transmission and modulation functions are more likely to be on the AEE layer in the Android operating system since the Android kernel is designed to support hardware from different manufacturers and some of them use GSM protocol (AT&T) and some use CDMA protocol (Sprint).

In the Android operating system, the runtime layer 162 also includes a library that implements the Dalvik Virtual Machine. A virtual machine is a software application that behaves as if it were an independent device with its own operating system. A virtual machine can emulate a computer that runs on an entirely different OS than the OS of the host machine running the virtual machine application. That is how Macs can display a Windows XP machine desktop and run Windows applications when running the Parallels™ application. The Android kernel uses virtual machines to run each application program as its own separate process. This allows each application to run without dependence on any other, and prevents the crash of one application from crashing any other applications simultaneously running in their own virtual machines. Running a separate virtual machine for every application also simplifies memory management for the kernel. In some embodiments, the text messaging, phone functions and Busy: Respond Later™ processes are each run on their own separate virtual machine running on the underlying platform, especially if the kernel 160 is Android™ OS.

The next level in the stack is a user interface and application framework 166 which is a set of programs that cooperate with the operating system to implement the basic functions of the phone and its user interface (drive and read the display, keyboard, trackball or other pointing device, etc.). Layer 166 includes a display manager program in some embodiments that is tightly tied to the kernel 160 and manages the phone display for the kernel. Such basic functions as resource allocation, telephone applications, switching between processes or programs and keeping track of the phone's physical location are done at this layer 166 in the embodiments using the Android kernel and in many other embodiments. The application framework 166 can be thought of as a set of basic tools which application developers can access to build higher level and more complex applications on the application layer 168 and for the Busy: Respond Later™ application 169. Although the Busy: Respond Later™ application 169 is shown as its own layer in FIG. 4 because it is an add-on application that most smartphones may not have when they come from the factory, in reality, to the kernel, the Busy: Respond Later™ application is just another application on the application layer 168.

The programs on application framework layer 166 include software that renders the graphics and layouts seen on the display. Basically, this layer of software, in most embodiments, includes drivers and interfaces with the display, keyboard and pointing device and may provide I/O services to all the other memory and storage devices in the phone. Memory and storage device I/O services and drivers may be included in the kernel 160 in some embodiments.

Finally, there is the application suite 168. This software layer represents the software applications that implement various basic functions the user can invoke such as making phone calls or receiving them, accessing the web browser, accessing the contacts list or address book, etc. Some of the basic applications of the Sprint Blackberry™ phone, represented by icons on the desktop are: launching the web browser and sending it a URL to direct it to the Sprint™ software store, making entries on calendars, setting alarms, reading and sending e-mail, receiving and sending text messages via SMS (if this function is not in the kernel), making and receiving phone calls (if this function is not in the kernel), using GPS navigation, performing instant messaging, locking the phone keyboard, performing media playback, performing web browsing (if not on the library layer 162), viewing an automatically compiled log of incoming and outgoing calls, viewing live TV, displaying a map, etc.

A barebones system to practice the invention only needs the kernel and I/O services software for the memory or storage device in which pre-typed text messages or outgoing voice messages are stored, display, keyboard and pointing device drivers and the protocol layer or library or application that implements text message functions and phone functions such that a predefined text or voice message may be sent by a touch of a button to the sender of an incoming text or the caller of an incoming phone call.

The Busy: Respond Later™ Application Process

The Busy: Respond Later™ application (BRL process) and its Application Programmatic Interface (API) is shown at 169 in FIG. 4. It is typically part of the application layer 168 even though it appears in FIG. 4 to be its own layer. The Busy keys are shown at 50 (SMS), 52 (Call) and 120 (Context Sensitive). If the embodiment is a one-key context sensitive embodiment, then only one key 120 is present. If the embodiment is a two key embodiment. Busy keys (SMS) 50 and (Call) 52 are both present. Any of these keys can be newly added buttons or keys or existing keys on the phone or keyboard. In some embodiments where existing keys are used for Busy keys 50, 52 and 120, one of the keys on the keyboard may be designated a hot key that must be simultaneously pushed to activate the existing key that represents Busy key 50 (SMS) or existing button or key that represents Busy key 52 (Call).

FIG. 4 shows how the BRL process 169 talks to the Busy keys 50, 52 or 120 and loads the pre-recorded text message(s) 171 or pre-recorded voice files 181 into memory 175 and 177 used by the operating system to send text messages or play outgoing voice messages, respectively. The automatic text message to be sent in response to an incoming text is stored in file 171 somewhere in memory on the smartphone. Multiple automatic response text files may exist and the user can select the message to be sent by manipulating data in a configuration file 179 during setup of the phone or just before starting to drive or starting a meeting. Likewise, digitized automatic voice response messages are stored in files 181 somewhere in memory on the phone. Each file may have a different message recorded by the user or downloaded from some service like a ringtone download service.

As a specific example of how, in some embodiments, the BRL process 169 creates pre-recorded text files 171 or pre-recorded voice files 181 consider the following. Suppose a pre-recorded voice file 181 is to be created by the BRL app (hereafter Busy app) 169 using a voice notes application on layer 168. The BRL app 169 makes one or more function calls to the API of the kernel asking it to activate the voice notes application and create a file with a specific name into which the pre-recorded voice message is to be recorded. Suppose the kernel provides an API function named MakeFile for creating files. When writing the part of the BRL app 169 program that creates the pre-recorded voice message file 181, the programmer would insert a line that looks like this:

MakeFile [1, % Name, 2]

In this example, the instruction tells the operating system 160 to create a file that will allow random access to its data (signified by the 1—the other option might be 0 for a serial file), will have a name typed in by the user (% Name) and will be a size that varies depending on how much data is stored in the file (signified by the 2—other options might be zero for a fixed size, and 1 for a file that grows as data is added but does not shrink when data is removed). The following is what the operating system does to turn the instruction into action.

The operating system 160 sends a query to the memory management function of the kernel 160 to get the location of the first available free storage location.

With that information, the operating system creates an entry in the file system of the cell phone showing the beginning and ending locations of the file, the name of the file, the file type, whether the file has been archived, which users have permission to look at or modify the file, and the date and time of the file's creation.

The operating system writes information at the beginning of the file that identifies the file, sets up the type of access possible and includes other information that ties the file to the application. In all of this information the queries to the disk drive and addresses of the beginning and ending point of the file are in formats heavily dependent on the manufacturer and model of the phone.

Because the programmer has written the program to use the API for disk storage, the programmer doesn't have to keep up with the instruction codes, data types and response codes for every possible phone and memory structure. The operating system, connected to drivers for the various hardware subsystems, deals with the changing details of the hardware. The programmer must simply write code for the API and trust the operating system to do the rest.

Although the text files 171 and voice files 181 and configuration file 179 and Busy keys 50, 52 and 120 are shown as connected to the Busy: Respond Later™ application, these are logical data paths only. In reality, the Busy: Respond Later™ application creates these files, accesses and reads the files, displays information on the display and reads the keyboard and Busy keys through the operating system kernel and its API 160 and the user interface driver framework and its API 166 and drivers on layer 166 that do storage input/output (I/O). Layer 166 includes drivers for the display and keyboard and pointer device and storage such as RAM or FLASH memory of the smartphone. Preferably, the pre-recorded text and voice messages in files 171 and 181 are stored in non-volatile memory. All the circuits shown in FIGS. 2 and 3 have interface circuitry (drivers) to talk to the microprocessor, typically through a bus and most if not all have driver applications which are software applications that allow the operating system to control the circuitry of the microprocessor to talk to the circuitry of the various peripheral devices such as the display, keyboard, pointing device, memory, GSM protocol RF transceiver 64, 3G protocol data transceiver 66, etc. to enable the microprocessor to send and receive data to and from these circuits.

Figure 5:
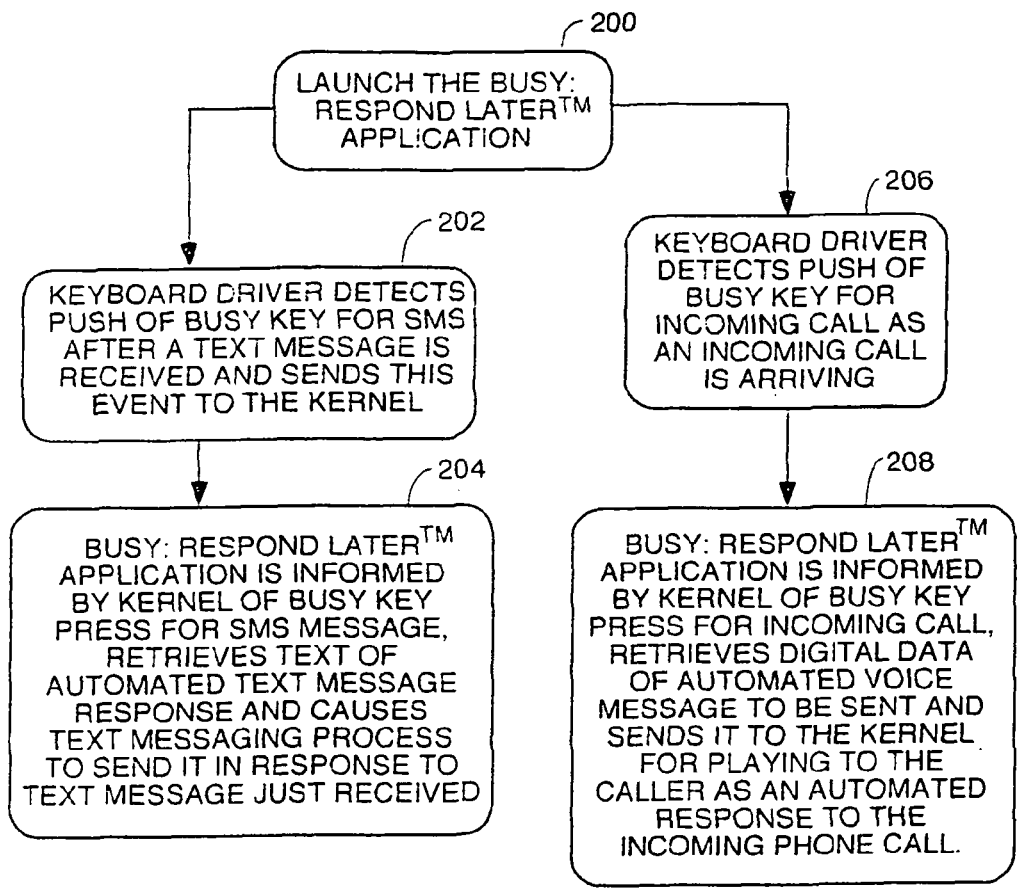
FIG. 5 is a flow diagram of one embodiment for a two Busy button process implemented by a Busy: Respond Later™ application to automatically respond to a Busy button push in either of two ways depending upon which button was pushed.

FIG. 5 shows an example of a typical way an automated response would work for a text message just received after the BRL process 169 (FIG. 4) is launched. Step 200 represents the process of launching the BRL process which is referred to in the claims as an "automated response application program". This launching step is performed manually in some embodiments by the user finding a button or key or an icon for the BRL process 169 on the phone, keypad, touchscreen or desktop of the phone and selecting it. In other embodiments, step 200 represents the step of automatically launching the BRL process 169 when the GPS of the phone detects that the phone is moving at driving speeds (faster than a human can walk or run in some embodiments). In other embodiments, step 200 represents the step of automatically launching the BRL process 169 whenever the phone is powered on. In embodiments where the BRL process is turned on automatically whenever the phone is moving at driving speed it involves the BRL process 169 making a function call to the kernel 160 to determine the phone's GPS position and then making the same function call a few minutes later to obtain the phone's position again and then calculating the distance between those two positions and dividing that distance by the time elapsed between the two position reports. The GPS puts times stamps in the meta-data of position reports so that meta-data can be checked to determine the time the phone was at each location. Any other way of determining the phone's speed through space will also suffice for this purpose. Whatever the phone's speed, the speed is compared against the speed at which a person can walk (or run in some embodiments) and if the phone is moving faster than a user can run, the BRL process 169 is automatically launched. Embodiments that allow manual turn on of the BRL process 169 or auto turn on at power up are preferred. In the claims, the claim elements referring to activating an automated response application program are intended to be interpreted to cover all these different embodiments for how the BRL process 169 is started.

Now suppose a text message is received while driving or in a meeting and the user of the phone presses the Busy key 50 (SMS) (FIG. 2) to send an automated text message in reply. It is possible that an accidental push of either of the Busy keys 50 or 52 in FIG. 2 or Busy key 120 in FIG. 3 can occur while the phone is being carried in the purse or pocket of the user. To prevent such a random push of the Busy key from launching the Busy application 169 in FIG. 4, the Busy application 169 is written to inquire of the kernel 160 when was the push of the Busy key relative to the time of the last text message and to inquire whether an incoming cellular call is being received. The push of the Busy key is ignored if a cell call is not arriving or a text message was not received within some predetermined small time such as 2 minutes from the time when the Busy key was pushed. This inquiry is part of the launch process of step 200 in FIGS. 5 and 6 and is part of the initial processing of all other launch steps in FIGS. 7-10. All the embodiments of FIGS. 5-10 should be interpreted however in the claims to have a similar embodiment that does not do this threshold inquiry of finding out when the Busy key was pushed relative to the time of the last text message or if an incoming cell call is arriving at the time the Busy key was pushed, and ignoring the Busy key push if a cell call is not arriving or a text message was not received within some predetermined small time such as 2 minutes from the time when the Busy key was pushed.

Step 204 in FIG. 5 represents the steps that the BRL process 169 takes after it is informed by the operating system that the Busy key 50 (SMS) has been pressed to retrieve the text of the automated text message reply and cause the text messaging process to send the automated response text message to the sender of the text message just received. Several sub-steps are carried out to accomplish this overall function.

Before functions recited in step 204 happen, there are other events that occur, and the details of one or more examples follow. Those skilled in the art appreciate that there is more than one way to cause the basic function of step 204 to occur and what follows is only one or more examples. The claims where the broad functions of step 208 are stated are to a be interpreted to cover all the various ways of accomplishing the function of step 208 since they are all structurally and functionally equivalent.

First, the fact that the Busy key 50 (SMS) has been pushed is detected by the keypad controller 56 in FIG. 2. This event represents either the detection by keypad controller 56 of the press of a dedicated Busy key 50 (SMS) or the press of an existing key on the phone, keypad or keyboard within some interval after an SMS message is received and the user is notified or the detection of a simultaneous press of a hot key and some other existing key on the keypad of the phone. In configurable embodiments, configuration file 179 (FIG. 4) stores data as to which existing keys are designated to serve the functions of Busy key 50 (SMS) or Busy key 52 (Call) or Busy key 120 (Context Sensitive).

The detection of the push of the Busy key 50 (SMS) (FIG. 2) causes a keyboard driver 166 (FIG. 4), which functions to translate between the kernel 160 and the keypad controller 56 (FIG. 2), to make a function call to the kernel 160 to notify it that the Busy key 50 (SMS) has been pushed. The kernel then makes a function call to the BRL process 169 through its API to notify the BRL process that the Busy key 50 (SMS) has just been pushed.

The BRL process 169 responds by retrieving the text message to be automatically sent and causing it to be sent. This step itself involves several substeps. First, the BRL process 169 makes a function call to the kernel requesting access to configuration file 179 (if present) so the particular text message to be sent can be determined. This results in the kernel making a function call to the API of the storage I/O driver on layer 166 requesting configuration file 179 be provided to the BRL process 169. This results in the contents of configuration file 179 being sent to the BRL process 169, which reads it and determines which of the pre-recorded text messages to send. The BRL process 169 then makes a function call to the kernel's API requesting access to the particular one of pre-recorded text files 171 which is to be sent which results, by a similar process, in the contents of the text file being sent to the BRL process 169. If the embodiment in question is not configurable and only one pre-recorded text message is available to send, the steps of first accessing the configuration file and then accessing whatever file it points to can be omitted. In such one message only embodiments, the text to be sent can be stored in the BRL app 169 and no access to files stored elsewhere on the phone need be made. Step 204 should be interpreted to cover all of these possible embodiments.

In order for the BRL process 169 to send the pre-recorded text message, it must cause the text messaging application to be launched, select the most recent text message received, send the pre-recorded text message to the text messaging process and cause the send command to be given. To accomplish these functions, step 204 represents the steps of sending a function call to the kernel to request it to launch the text messaging process. Normally, the user launches the text messaging process by manipulating the track ball or the touchscreen to select the text messaging icon on the desktop or by pushing some other key or combination of keys on the keypad. Regardless of the type of phone or keypad controller or touchscreen controller, whatever is done on the particular phone involved to launch the text messaging function results in a function call to the API of the kernel. The BRL process 169 automatically makes that same function call to the kernel that the keypad controller and its driver would normally make to launch the text messaging process when the user does what they normally do on the phone to launch the text messaging process. Next the BRL process 169 makes whatever function call the keypad controller or touchscreen controller would make to select the most recent text message received. On a Blackberry™ smartphone where the messaging application records all incoming and outgoing text messages and phone calls, the user must roll the trackball to the text message to which a reply is to be sent. Since there will be many text messages on the message log usually, and they will be mixed in with message logs of phone calls received and made, some human intelligence is involved. The user must look at the message log, mentally select the text message to which a reply is to be sent, roll the trackball to it and press the trackball to select the message and press the trackball again to bring up a menu of things the user can do with the message, e.g., copy, reply, forward, delete. Then the user must roll the trackball down to the reply command and press the trackball again to put the text messaging process into reply mode. All this manual processing is replaced in the BRL process by making a function call to the kernel's API and asking for the contents of the message log to be sent to the BRL process 169. This file will have entries in it for incoming phone calls, outgoing phone calls, incoming texts and outgoing texts. The BRL process 169 (FIG. 4) makes a timestamp entry when it receives word that the Busy key 50 (SMS) has been pushed and then searches the metadata of the various entries in the message log for an incoming text message with a timestamp just before the timestamp of the push of the Busy key SMS. When an incoming text message is found with metadata indicating it was received immediately preceding the Busy key push, the BRL process 169 then makes appropriate function calls to the kernel API or the text messaging application (whatever is appropriate for the host phone) to cause it to select that text message just located and put the text messaging application into reply mode. The BRL app 169 then makes appropriate function calls to the kernel or the text messaging application and passes the text to be sent automatically to the text messaging application. This may be done by way of storing the text message in the keyboard buffer 175 (FIG. 4) or it may be done by sending the message to be sent automatically to the text messaging application as an argument to a function call that says send as a text the message included in the argument to this function. Whatever must be done on the phone to send a reply text message is done in the appropriate sequence by the BRL process 169 making the appropriate function calls at the appropriate time.

The text message application then packetizes the pre-recorded text message received from the BRL process into control packets which include header information about which text message the packetized text message is a reply. These packets containing the automated text message reply are then sent with a function call to the kernel 160 (FIG. 4). The kernel 160 then sends the packets to the library or driver which is controlling the radio frequency transmitter which is receiving and sending the control packets to the cell towers. That application or driver or library that implements the text message functionality then sends the control packet to the cell tower. (This may be done in some embodiments through function calls to the kernel 160 with the control packets as arguments). The kernel then makes a function call to the driver in the application execution environment 164 for the GSM RF transmitter 164 and passes it the control packet. The RF transmitter then sends the control packet to the cell tower and the automatic text message response is thereby transmitted into the cell system just as if it were typed manually by the user.

Now suppose while the user of the phone is driving, an incoming phone call occurs. The cell phone displays the caller ID and the user typically will look at it to determine who is calling. If the caller is sufficiently important to the user the user may choose to pull over and answer the call normally and talk to the caller. However, if the user chooses to keep driving instead of taking the call, the user presses the Busy key 52 (Call) in FIG. 4 for an incoming call. This causes the basic function indicated in step 208 to happen where the digitized voice of an automated reply is played to the caller which indicates that the called party is busy driving or otherwise engaged and cannot take the call at that time.

Before the functions of step 208 happen, other events occur and the details of one or more examples thereof follow. Those skilled in the art appreciate that there is more than one way to cause the basic function of step 208 to occur and what follows is only one or more examples thereof. The claims where the broad functions of step 208 are stated are to be interpreted to cover all the various ways of accomplishing the function of step 208 since they are all structurally and functionally equivalent.

First, the fact that the Busy key 52 (Call) has been pushed is detected by the keypad controller 56 in FIG. 2. The causes a keyboard driver 166 in FIG. 4, which functions to translate between the kernel 160 and the keypad controller 56, to make a function call to the kernel 160 to notify it that the Busy key (Call) 52 has been pushed (or the existing key or existing key and hot key designated for that function in the configuration file 179). The kernel then makes a function call to the BRL process 169 through its API to notify the BRL process that the Busy key 50 (SMS) has just been pushed.

The BRL process 169 responds by retrieving the digitized data of the automated reply voice message to be automatically sent and causing it to be played to the caller as an automated response to the incoming call. This step itself involves several substeps. First, in configurable embodiments, the BRL process 169 makes a function call to the kernel requesting access to configuration file 179 shown in FIG. 4 (if present) so the particular voice message to be sent can be determined. This results in the kernel making a function call to the API of the storage I/O driver on layer 166 requesting configuration file 179 be provided to the BRL process 169. This results in the contents of configuration file 179 being sent to the BRL process 169, which reads it and determines which of the pre-recorded voice messages to send. The digital data of the pre-recorded voice messages can be either recorded by the user and digitized on the phone or downloaded from a server on the internet like ring tones are downloaded. The BRL process 169 then makes a function call to the kernel's API requesting access to the particular one of the pre-recorded voice files 181 which is to be sent which results, by a similar process, in the contents of the voice file being sent to the BRL process 169. If the embodiment in question is not configurable and only one pre-recorded voice message file is available to send, the steps of first accessing the configuration file and then accessing whatever file it points to can be omitted. In some one voice message only embodiments, the digital data of the voice message to be sent can be stored in a version of the BRL app 169 which is hardwired in circuitry with its own memory, and no access to digitized voice files stored elsewhere on the phone need be made. Step 208 should be interpreted to cover all of these possible software and hardware embodiments to accomplish the stated function since they are all equivalent.

To actually play the automated voice response to the caller, the BRL app 169 makes the same function call or calls that would be made if the user were to push whatever button exists on the phone to answer an incoming call. Typically that would be a function call to the kernel from the keypad controller's driver software 166 to indicate that the user has pushed the button that needs to be pushed to answer the call. This results in the kernel making whatever function calls it normally makes to control the phone's phone call circuitry and transmitters to answer the call, and start transmitting and receiving on the channels designated by the control packet from the cell tower designating the channel frequencies for send and receive and telling the phone to play its ringtone. The BRL process then makes whatever function calls are necessary to copy the digitized voice data of the automated voice message reply into the outgoing voice message buffer 177 in FIG. 4. This is the same buffer that is filled with digitized voice data when a user speaks during a normal cell so phone call and the phone digitizes the voice and puts the data into buffer 177. The digitized voice data in buffer 177 is then packetized by the phone's call circuitry and software into packets for whatever CDMA, GSM or other protocol the phone uses for cell calls.

Figure 6:
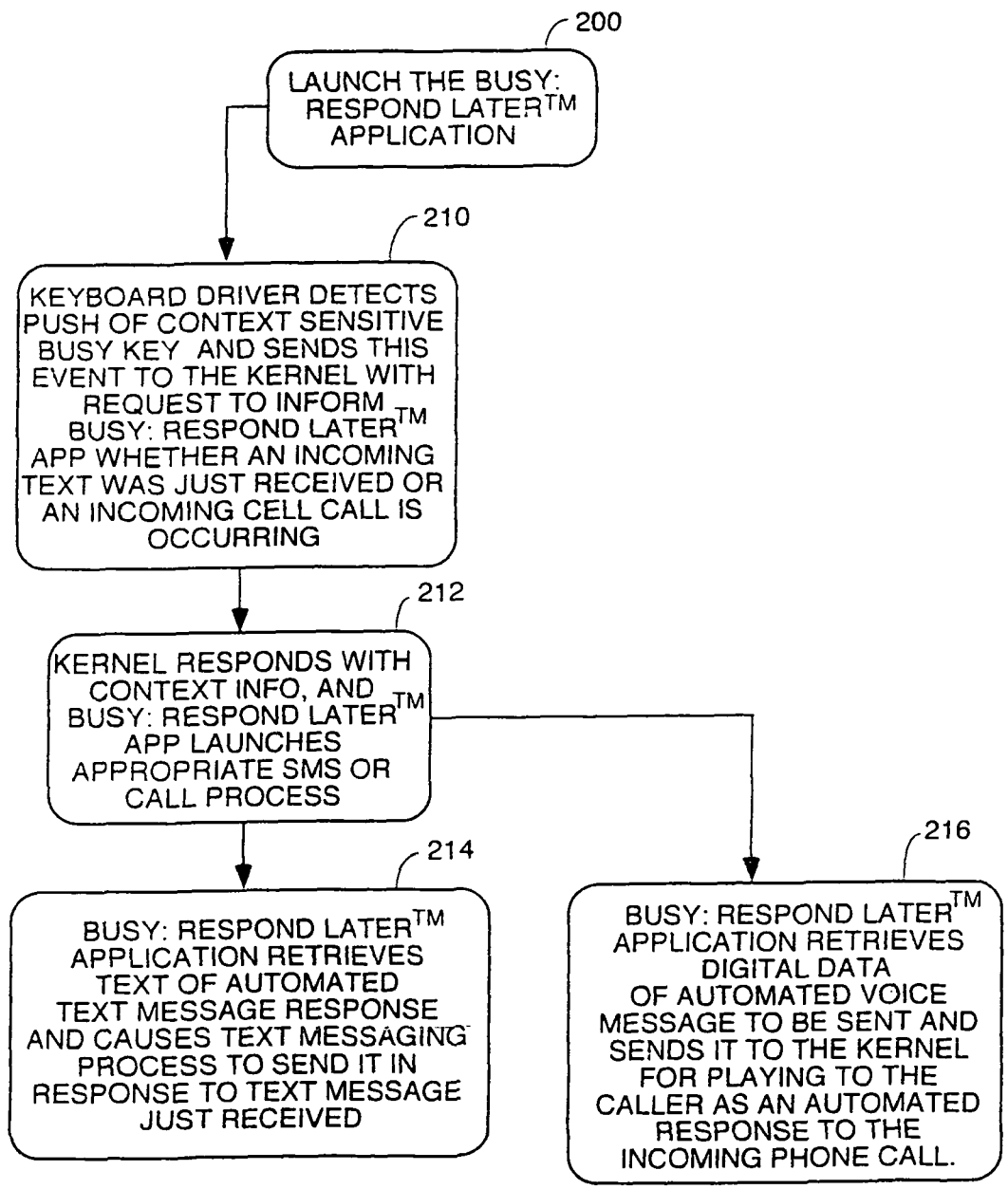
FIG. 6 is a flowchart for one example of a single, context sensitive BRL app process where the BRL app responds in either of two Ways depending upon what the context was when the context sensitive Busy button was pushed.

FIG. 6 is a flowchart for one example of a single, context sensitive BRL app process where the BRL app responds in either of two ways depending upon what the context was when the Busy button 120 (Context Sensitive) (FIG. 4) was pushed. Step 212 represents the launching of the BRL app which can be done in any of the ways previously described. Step 210 represents the process of the keypad controller detecting the push of the Busy button 120 (Context Sensitive) (which can be a newly added button or an existing key on the keyboard or a hot key and another existing key on the keyboard). The driver 166 for the keypad controller makes one or more API calls to the kernel informing it of this event and requesting the kernel to inform the BRL app whether an SMS text was just received or an incoming phone call is being received. The kernel does whatever is necessary for its structure and operation to determine if a text message was just received or an incoming cell call is being received, and responds in step 212 with a function call to the API of the BRL app 169 (FIG. 4). This function call informs the BRL app of whether a text message has just been received or a cell call is arriving. The BRL app responds by performing the functions of step 214 if a text was just received or performing the functions of step 216 if a cell call is occurring. In step 214, the BRL app retrieves the text of the automated text message to be sent and causes it to be sent to the sender of the most recently received text message, all as previously described.

In step 216, the Busy app 169 (FIG. 4) makes a function call to the kernel to cause it to answer the call. This function call is the same one made by the keyboard driver 166 when the user is receiving an incoming cell call and presses the "answer" button on the keypad. This causes the kernel to make a function call to the cellular phone call process on whatever software layer or circuitry that process is implemented. This function call causes the cell phone call process to answer the call by whatever mechanism the phone uses to perform that function. Usually that involves causing the ring tone to stop being played, and setting up the receiver and transmitter frequencies to the frequencies set in the control packet that contained the "ring your ring tone" message. The cell phone call circuitry and software then sets up processing to receive digitized voice data from the caller and convert it to analog and play it on speaker 98 (FIG. 2) and set up processing to packetize digitized voice data spoken by the user receiving the call and transmitting the packets to the cell tower via transmitter 64 and power amplifier 68 (FIG. 2).

The BRL app 169 then retrieves the digitized data of the automated voice in the manner previously described and causes it to be played to the caller in the manner previously described. In some embodiments, step 216 includes the step of making whatever function calls and doing whatever is necessary on the host cell phone to divert an incoming cellular call to voicemail after playing the pre-recorded audio message retrieved by the BRL app 169 so that the caller can leave a message regarding what he or she was calling about. One such embodiment is depicted in FIG. 7.

Figure 8:
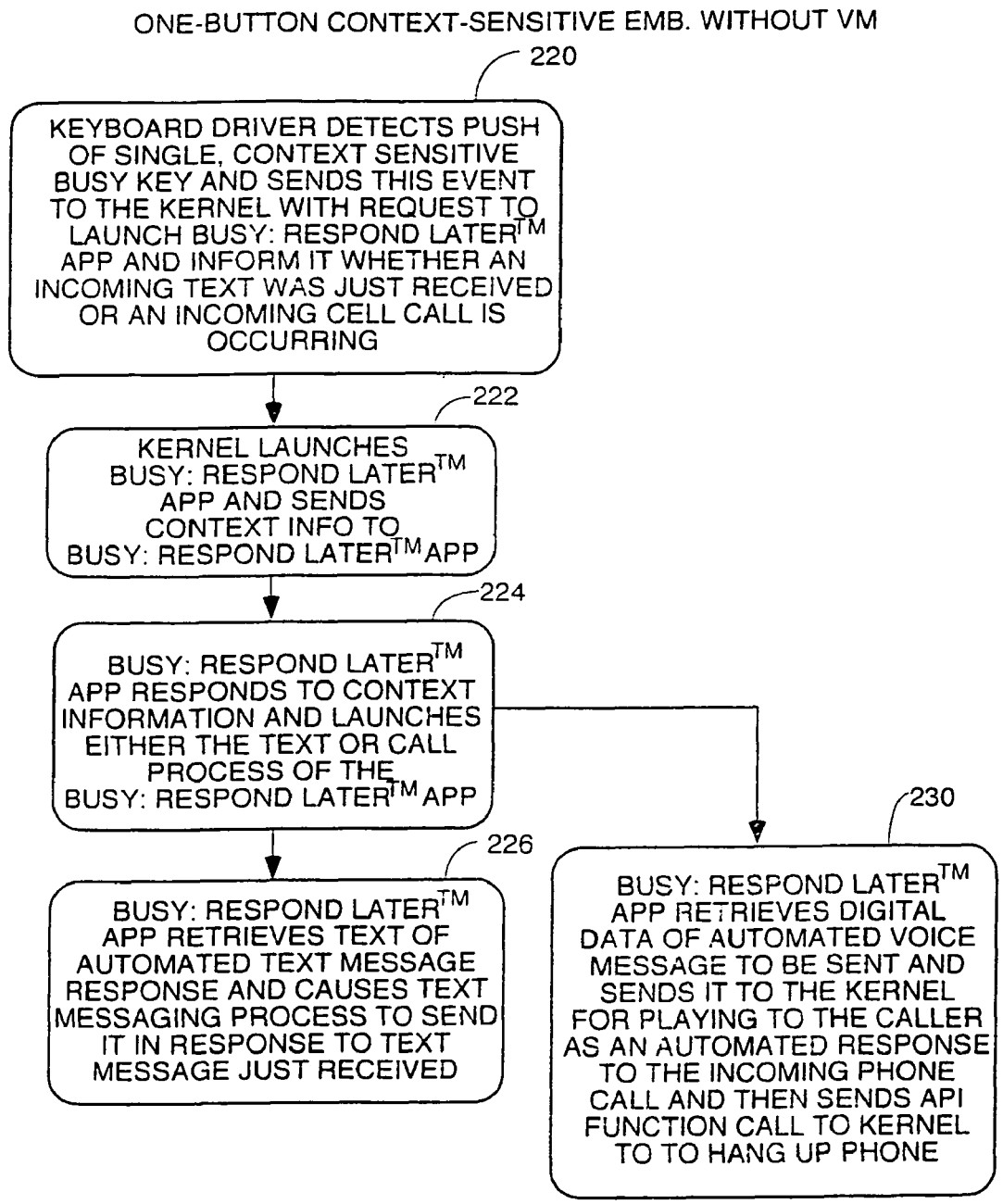
FIG. 8 is a flowchart for one example of a single-button, context-sensitive embodiment to, upon one or more pushes of a single Busy button both launches the Busy application 169 (FIG. 4) and uses it to send an automated text message in response if a text message was just received or, if an incoming cellular phone call is being received when said Busy button is pushed, plays an automated voice response to the cellular phone caller and then hang up the phone to end the call without sending the caller to voicemail.
Figure 9:
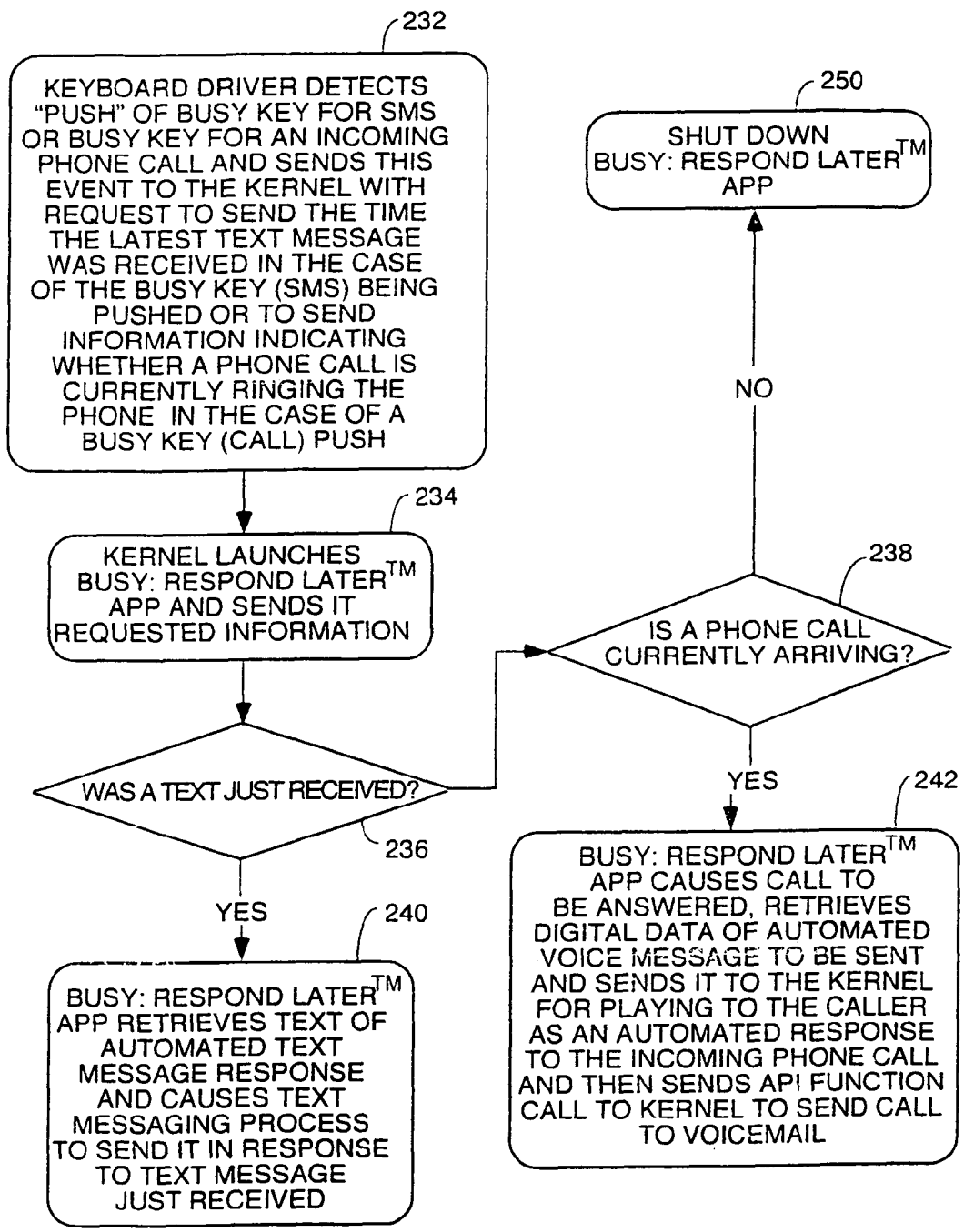
FIG. 9 is a flowchart for one example of a two-button "one push" embodiment to, upon one or more pushes of a single Busy button, both automatically launch the Busy application 169 (FIG. 4) and use it to automatically send a pre-typed text message in response if a text message was just received or, if an incoming call is being received when said Busy button is pushed, play an automated voice response to a caller and then automatically send the call to voice mail and record any message the caller leaves.
Figure 10:
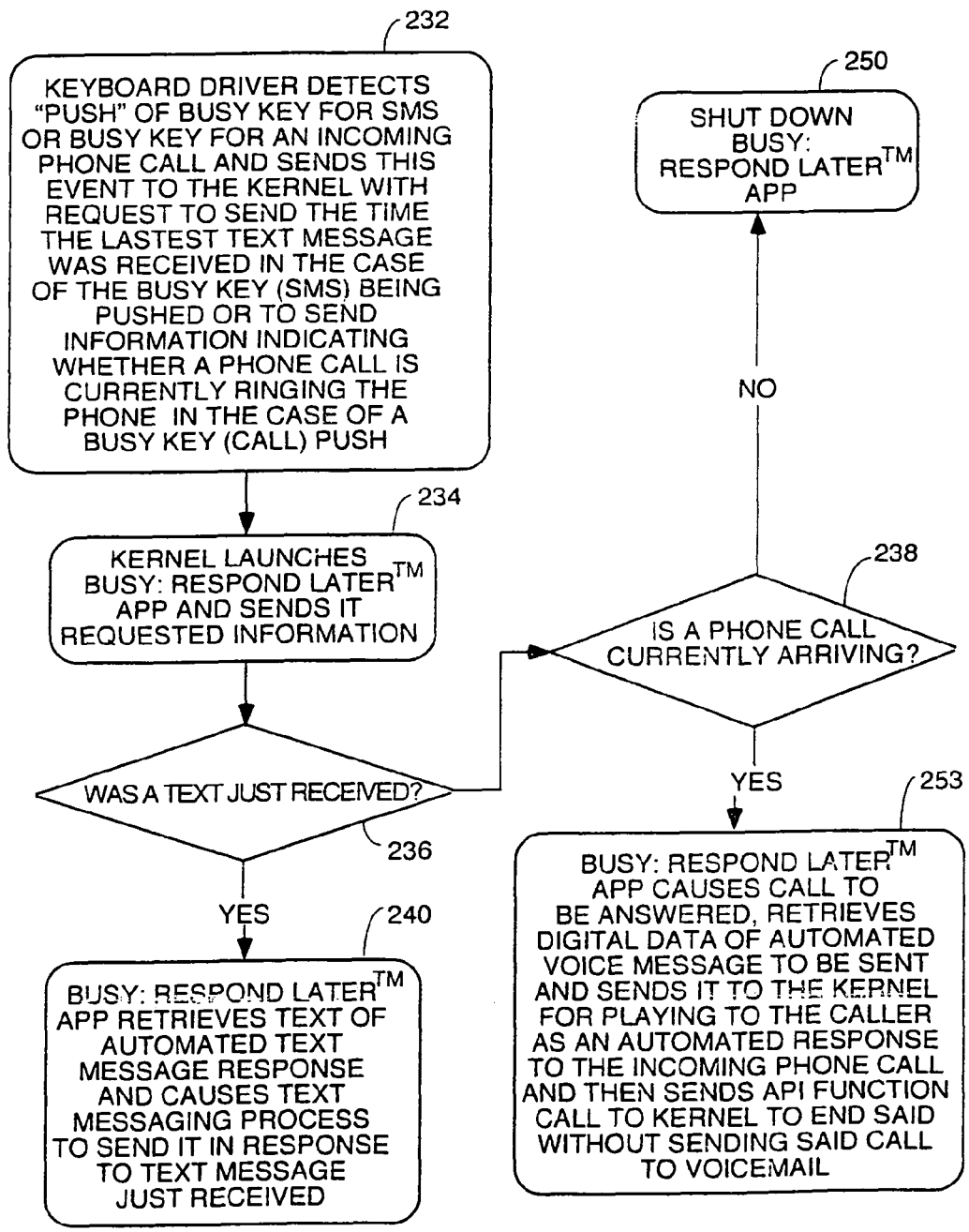
FIG. 10 is a flowchart for one example of a two-button "one push" embodiment to, upon one or more pushes of a single Busy button, both automatically launch the Busy application 169 (FIG. 4) and use it to automatically send a pre-typed text message in response if a text message was just received or, if an incoming call is being received when said Busy button is pushed, play an automated voice response to a caller and then automatically hang up the phone without sending the call to voicemail.

It is useful to have the automated response system do everything that needs to be done with just a single push of a button to send an automated response including launching the Busy application. The embodiments of FIGS. 7, 8, 9 and 10 all share that same feature. A single push of a button does it all. The embodiments of FIGS. 7 and 8 are single-button, context-sensitive embodiments. The embodiments of FIGS. 9 and 10 are two-button embodiments where one button is pushed to respond automatically to a text message just received and another button automatically answers an incoming call and automatically plays a voice message.

FIG. 7 Embodiment

Figure 7:
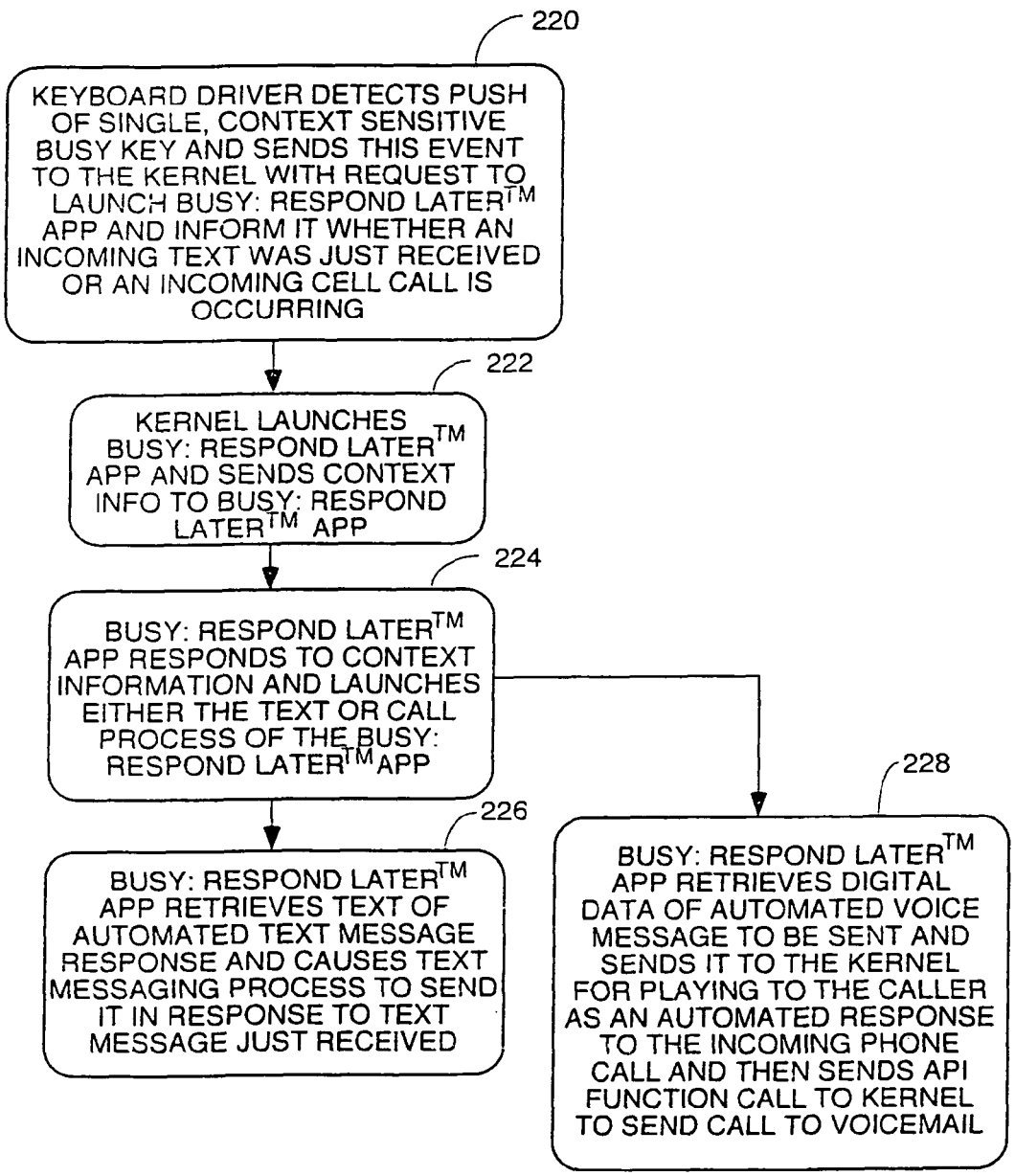
FIG. 7 is a flowchart for one example of a single-button, context-sensitive embodiment to, upon one or more pushes of a single Busy button, both launch the Busy application 169 (FIG. 4) and uses it to send an automated text message in response if a text message was just received or, if an incoming cellular phone call is being received when said Busy button is pushed, play an automated voice response to the cellular phone caller and then automatically sends the call to voice mail and records any message the caller leaves.

FIG. 7 is a flowchart for one example of a single-button, context-sensitive embodiment to, upon one or more pushes of a single Busy button, both launch the Busy application 169 (FIG. 4) and use it to send an automated text message in response if a text message was just received or, if an incoming call is being received when said Busy button is pushed, play an automated voice response to a caller and then automatically send the call to voice mail and record any message the caller leaves.

Step 220 represents the process of the keyboard driver software 166 (FIG. 4) and the keypad controller 124 (FIG. 3) detecting the fact that a single, context-sensitive Busy key 120 has been pushed one or more times. In some embodiments, only a single push may be required. In other embodiments, two or more consecutive pushes of the Busy key within a predetermined time may be necessary to launch the Busy app 169 to prevent an accidental push while the phone is being carried in the purse or pocket of the user from launching the Busy app and automatically replying to a text message or an incoming phone call. This key will be pushed by the user when either a text message has just been received or an incoming cell phone call is ringing the phone. The driver 166 makes a function call to the kernel 160 in FIG. 4 with an argument informing the kernel that the Busy key 120 (Context Sensitive) has been pushed and requesting that the Busy app 169 (FIG. 4) be launched and that information be sent to the Busy application by the kernel informing the Busy app whether a text message has just been received or an incoming cell phone call is arriving. The kernel, in a version of this embodiment, has been modified to respond to the press of the Busy key by making a function call to the Busy application 169 to launch it, as symbolized by step 222. In step 222, the kernel 166 also determines whether a text message has just arrived or an incoming cell phone call is presently ringing the phone, and this status information is sent to the Busy app 169 when it is launched.

Step 224 symbolizes the process carried out by the Busy app of responding to the API function call by the kernel by launching the appropriate text messaging or cell call process, as appropriate based upon the status information sent by the kernel as to whether a text has just been received or a cell call is currently ringing the phone.

If a text message has just been received, step 226 is performed by the Busy app to retrieve the automated text message response and to cause this automated message to be sent in response to the text message just received. The details of this step and alternatives are the same as previously discussed in the discussion of step 214 in FIG. 6.

If an incoming phone call is currently ringing the cell phone, the Busy application responds to the function call by the kernel by performing step 228. In this step, the Busy app makes a function call to the kernel to cause it to answer the call. This function call is the same one made by the keyboard driver 166 (FIG. 4) when the user is receiving an incoming cell call and presses the "answer" button on the keyboard. This causes the kernel to make a function call to the cellular phone call process on whatever software layer or circuitry that process is implemented. This function call causes the cell phone call process to answer the call by whatever mechanism the phone uses to perform that function. Usually that involves causing the ring tone to stop being played, and setting up the receiver and transmitter frequencies to the frequencies set in the control packet that contained the "ring your ring tone" message. The cell phone call circuitry and software then sets up processing to receive digitized voice data from the caller and convert it to analog and play it on speaker 98 (FIG. 2) and set up processing to packetize digitized voice data spoken by the user receiving the call and transmitting the packets to the cell tower via transmitter 64 and power amplifier 68 (FIG. 2).

The Busy app then also (step 228 continued) retrieves the digital data of the automated voice message to be played and causes it to be played by the kernel to the caller as an automated response to the incoming phone call. Typically, this is done by sending the digitized voice data (already compressed) to the kernel which makes a function call to the cell phone call process and sends it the compressed voice data. The cell phone process has a packetization process which takes the compressed voice data of the automated voice message and puts it into packets in the format (GSM, TDMA, etc.) used by the cell phone networks cellular call data path in the same way the outgoing voicemail announcement message is transmitted. The packets containing the "I am busy and cannot take your call right now" type message are then transmitted on the cellular network's cell phone data path and are routed via the other pathways discussed in FIG. 1. When they reach the cell phone of the caller, the digitized voice data is converted back to the analog voice signal and played to the caller. If the caller is calling from an analog land line, the digitized voice data is converted to an analog signal at the central switching office of the landline system connected to the callers phone and this analog voice signal is transmitted to the land line phone. The details of this process up to this point are as previously discussed in connection with the discussion of step 216 in FIG. 6.

It may be frustrating for callers to hear only the automated voice message and not be able to leave a message saying what they are calling about. To alleviate that, the Busy app also performs the following function in step 228. After the automated "I am busy" voice message is transmitted, the Busy app then makes whatever function call to the API of the kernel as is necessary to divert the call directly into voicemail. The resulting processing will then be similar to the processing which results when the user receives an incoming phone call and presses the ignore button except that at this point, the call has already been answered and the transmitter and receiver have already been set up on the frequencies designated in the control packet that instructed the phone to sound its ringtone. The resulting function calls cause the kernel to take the digital data in the packets that contain the digitized voice of the incoming caller and store them in a voicemail file created by the kernel with metadata in the header of the file that indicates the caller's name if the caller ID is not blocked and is in the phone's address book, and which also indicates the date and the time of the call.

FIG. 8 Embodiment

FIG. 8 is a flowchart for one example of a single-button, context-sensitive embodiment to, upon one or more pushes of a single Busy button both launch the Busy application 169 (FIG. 4) and use it to send an automated text message in response if a text message was just received or, if an incoming call is being received when said Busy button is pushed, play the automated voice response to a caller and then hang up the phone to end the call without sending the caller to voicemail.

The process of FIG. 8 is identical to the process of FIG. 7 up to the performance of step 228 in FIG. 7. In FIG. 8, step 230 is performed instead of step 228. Step 230 is similar in processing to step 228 except that after playing the automated response voice message, instead of automatically sending the call to voice mail, the Busy application makes the same function call to the kernel as the keyboard driver would make if the user pressed the end call or hang up button on the phone. This causes the kernel to make the appropriate processing to hang up the phone without sending the call to voicemail.

FIG. 9 Embodiment

FIG. 9 is a flowchart for one example of a two-button "one push" embodiment to, upon one or more pushes of a single Busy button, both automatically launch the Busy application 169 (FIG. 4) and use it to automatically send a pre-typed text message in response if a text message was just received or, if an incoming call is being received when said Busy button is pushed, play an automated voice response to a caller and then automatically send the call to voice mail and record any message the caller leaves.

Step 232 represents the process of the keyboard driver 166 (FIG. 4) and keypad controller 56 (FIG. 2) detecting the "push" of either the Busy key (SMS) 50 (FIG. 2) or the Busy key (Call) 52 (FIG. 2) and sending this event to the API of the kernel 160 (FIG. 4) as a function call with a request. In some embodiments (FIG. 11 for example) spurious Busy key pushes are eliminated by counting how many times the Busy key was pushed in a predetermined amount of time. In embodiments represented by FIG. 9, spurious Busy key pushes are eliminated by determining when the push occurred relative to the time of the latest text message in the case of a Busy key 50 (SMS) push or if an incoming call is ringing the phone in the case of a Busy key 52 (Call) push. In the embodiment of FIG. 9, step 232 also represents the process of sending an API function call to the kernel asking it to report the time the last text message was received if the Busy key (SMS) is pushed or to report whether an incoming cell call is currently ringing the phone if the Busy key (Call) was pushed.

The Busy keys 50 (SMS) and 52 (Call) can be new buttons added anywhere on the phone or displayed anywhere on any touchscreen display, preferably the home display (the first one shown when the touchscreen is activated from sleep). They can also be existing keys on the keypad, preferably ones that can be found by feel without looking at the keypad such as the spacebar, or existing keys on the keypad which need to be pushed simultaneously with a hot key which can be another key on the keypad. Preferably, the Busy keys 50 (SMS) and 52 (Call) are buttons which have been added to the sides, top or bottom edges of the phone to make them easy to find by feel without having to look at the phone.

The term "push" should be interpreted to mean one or more pushes of the Busy key (SMS) 50 or one or more pushes of the Busy key (Call) 52. The reason for requiring multiple pushes of the Busy key within a given time or inquiring when the last text message was received or whether an incoming call is ringing the phone currently is to prevent accidental Busy key pushes while the phone is being carried from launching the Busy application and sending spurious text messages that the user is busy or driving when that is not the case. Some embodiments may require only a single push. In these embodiments, the steps 236 and 238 are performed to ensure that the push of the Busy key was not spurious. Step 236 is a process carried out by the Busy app 169 (FIG. 4) to compare the time of the Busy key (SMS) push, as reported by the kernel, to the time the latest text message was received, as reported by the kernel, to ensure that the Busy key (SMS) 50 was pushed within some close time proximity to the receipt of the most recent text message (such as two minutes). If not, it is probably a spurious push and is ignored. Step 238 is performed by the Bus app. 169 (FIG. 4) to determine if the Busy key (Call) 52 was pushed while an incoming cell call is ringing the phone. If not, the push is probably spurious.

Figure 11:
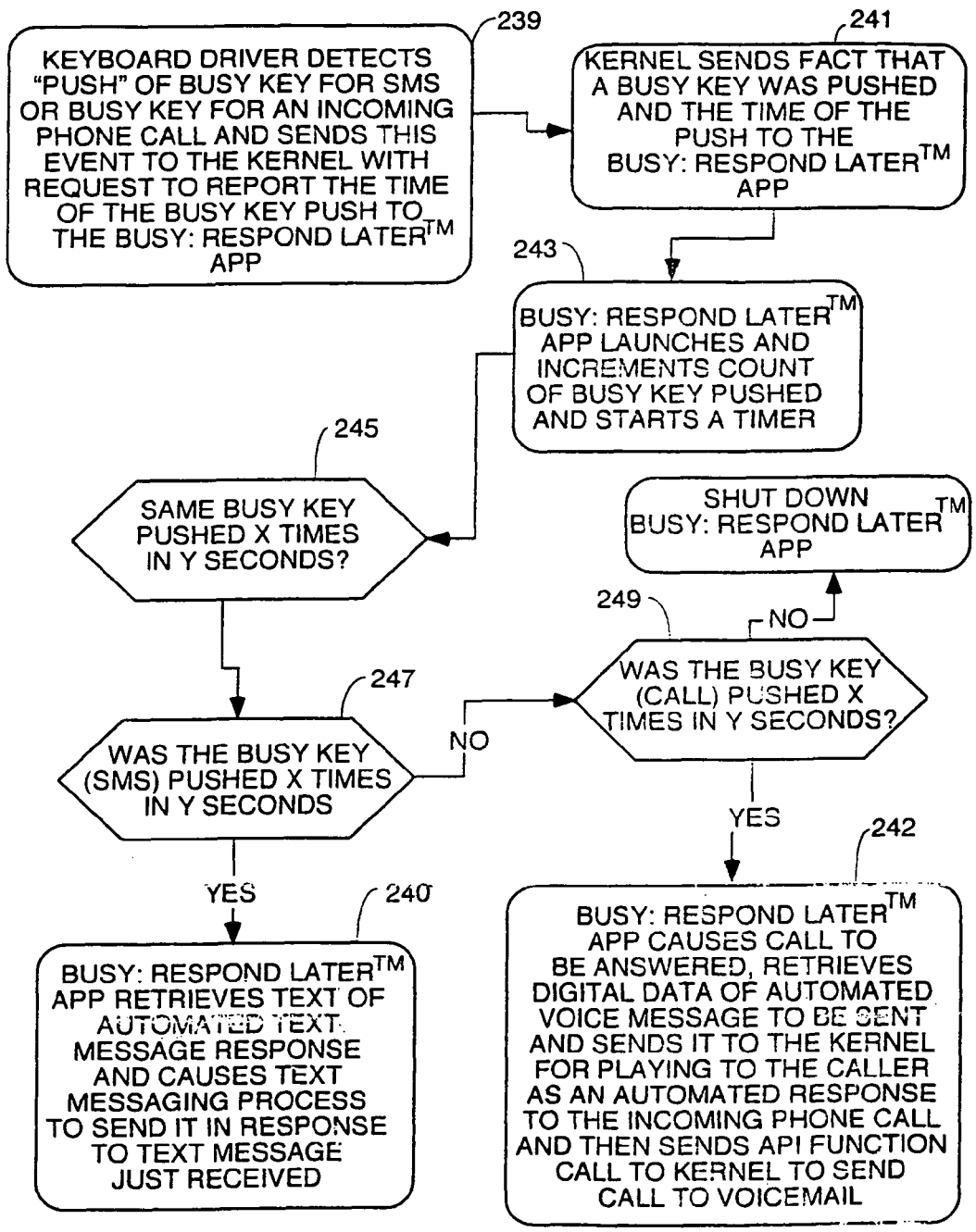
FIG. 11 is a flowchart of a two-key embodiment which requires multiple pushes within a short time to automatically launch the Busy application 169 (FIG. 4) and automatically send a pre-typed text reply to a text sender or a pre-recorded voice response to a caller.

Other embodiments, symbolized by the flowchart of FIG. 11, may require two or three consecutive pushes (referred to as X in FIG. 11) within a predetermined time (referred to as Y seconds in FIG. 11). In these embodiments, the only request to the kernel in step 232 is to report the times the Busy key was pushed each time it was pushed within the last predetermined number of minutes or seconds. In these embodiments, steps 236 and 238 are not required because it is unlikely that, for example, two or three consecutive pushes of the same Busy key 50 or 52 within a matter of seconds was random and spurious. In these embodiments, the Busy app 169 (FIG. 4) is informed of a Busy key push and the time of the push and which Busy key was pushed by the kernel each time a Busy key is pushed (steps 239 and 240 from FIG. 11). The Busy app then launches and starts a timer and starts counting the pushes within an elapsed time of Y seconds (or minutes, step 243). If X pushes of the same key occurs within Y time (step 245), the Busy app determines which Busy key was pushed (steps 247 and 249) and then performs the automated text message reply (step 240) or the automated voice message reply following by diverting the call to voicemail (step 242). In some alternative embodiments, the diversion of the call to voicemail can be eliminated and the phone is just hung up automatically after automatically playing the pre-recorded voice message.

Returning to the consideration of FIG. 9, step 234 represents the process of the kernel making an API function call to the Busy app to launch it and send it the time of the Busy key push, whether the Busy key 50 (SMS) was pushed or whether the Busy key 52 (Call) was pushed, and send it the requested information as to the time when the most recent text was just received in the case of a Busy key 50 (SMS) push or whether or not an incoming phone call is currently ringing the phone in the case of a Busy key 52 (Call) push.

Step 236 represents the process carried out by the Busy app 169 (FIG. 4) to determine if a text was received within a predetermined time of the Busy key 50 (SMS) push. If so, step 240 is performed and its details are as previously described in the other flowcharts in which a step 240 appears. If step 236 determines that a text was not just received within a predetermined time such as a few seconds or a minute or two of the Busy key push, step 238 is performed. Step 238 determines if an incoming phone call is currently ringing the phone when the Busy key 52 (Call) was pushed. If so, step 242 is performed to answer the call, play an automated voice response indicating the user is driving or busy and then diverting the call to voicemail. If steps 236 and 238 determine that neither a text was just received nor is an incoming phone call currently ringing the phone, the conclusion is that the push of the Busy key was a spurious push, and step 250 is performed to shut down the Busy app.

FIG. 10 Embodiment

FIG. 10 is a flowchart for one example of a two-button "one push" embodiment to, upon one or more pushes of a single Busy button, both automatically launch the Busy application 169 (FIG. 4) and use it to automatically send a pre-typed text message in response if a text message was just received or, if an incoming call is being received when said Busy button is pushed, play an automated voice response to a caller and then automatically hang up the phone without sending the call to voicemail.

The embodiment of FIG. 10 is identical to the embodiment of FIG. 9 except that, in step 253, the call is simply ended after the pre-recorded audio message is played instead of diverting the call to voicemail.

Although the invention has been disclosed in terms of the preferred and alternative embodiments disclosed herein, those skilled in the art will appreciate that modifications and improvements may be made without departing from the scope of the invention. For example, the functions described herein can be performed by any piece of software on any layer of FIG. 4 including modifications of the kernel. Modifications of the kernel are not preferred because that requires redistribution of the operating system to all platforms using an obsolete version of the operating system just to implement a new application like the Busy app. However, it is only important for purposes of practicing the various embodiments, that the functions described for each embodiment be performed somewhere by either hardware or software, and the automated text or voice response be sent from the phone to the sender of the text or a caller. All such modifications are intended to be included within the scope of the claims appended hereto.

What is claimed is:

1. A conventional cell phone apparatus which has been modified to add a software application or which has had the operating system or other software installed by the manufacturer of said cell phone apparatus modified such that said software application which has been added or said operating system or other software installed by said manufacturer of said cell phone apparatus is structured to control said cell phone to respond to the touch or press by a user of said cell phone apparatus of one or more Busy keys in a predetermined sequence, each of said Busy keys being a key or switch which has been added to said cell phone or to a keypad of said cell phone or each of said one or more Busy keys being a touch sensitive area which has been added to an area of a screen or page displayed on a touchscreen display of said cell phone apparatus and displayed on said touchscreen display with an indication of the function which will be invoked if that area is touched, or a touch sensitive area which has been added to the visual depiction of a keypad on said touchscreen display of said cell phone apparatus, said software application which has been added to said cell phone apparatus or said operating system of said cell phone apparatus or said other software installed by said manufacture of said cell phone apparatus controlling said cell phone apparatus to automatically respond to the touch or press of a said one or more Busy keys in said predetermined sequence in response to an incoming text message so as to send a predetermined text message to the sender of said text message just received, via the Short Message Service Data Channel on which said incoming text message was received.

2. A conventional cell phone apparatus which has been modified to add a software application or which has had the operating system or other software installed by the manufacturer of said cell phone apparatus modified such that said software application which has been added or said operating system or other software installed by said manufacturer of said cell phone apparatus is structured to control said cell phone to respond to the touch or press by a user of said cell phone apparatus of one or more Busy keys in a predetermined sequence, each of said Busy keys being a key or switch which has been added to said cell phone or to a keypad of said cell phone or each of said one or more Busy keys being a touch sensitive area which has been added to an area of a screen or page displayed on a touchscreen display of said cell phone apparatus, said touch sensitive area displayed on said touchscreen display with an indication of the function which will be invoked if said touch sensitive area is touched, or a touch sensitive area which has been added to the visual depiction of a keypad on said touchscreen display of said cell phone apparatus, said software application which has been added to said cell phone apparatus or said operating system of said cell phone apparatus or said other software installed by said manufacture of said cell phone apparatus controlling said cell phone apparatus to automatically respond to the touch or press of a said one or more Busy keys in a predetermined sequence in response to an incoming cellular phone call so as to answer said phone call and send it to voicemail and also send a predetermined text message to the sender of said text message just received, via the Short Message Service Data Channel.

3. A process carried out on a cell phone comprising the steps:
  A) receiving an incoming Short Message Service text message or an incoming cellular phone call;
  B) detecting a push of a Busy key on said cell phone and sending that event to an operating system of said cell phone with a request to send to a Busy application program on said cell phone the time of the Busy key push;
  C) sending a function call to a Busy application program on said cell phone with the time of the Busy key push;
  D) launching said Busy application program on said phone when said function call in step C is sent and starting a timer and incrementing a count of the number of pushes of said Busy key;
  E) determining if said Busy key was pushed X time in Y seconds;
  F) if said Busy key was pushed X times in Y seconds, determining if a text message was received just before said Busy key was pushed or was received while said Busy key was being pushed, and, if so, automatically selecting the text message received just before the Busy key was pushed or which was received while said Busy key was being pushed and automatically sending a pre-typed text message to the sender of said text message without any further interaction with said user of said cell phone; and
  G) if said Busy key was pushed X times in Y seconds while an incoming cellular telephone call was ringing the ringtone of said cell phone, automatically answering said incoming cell phone call and playing a pre-recorded audio message to said caller.

4. The process of claim 3 further comprising the step of playing a voicemail announcement message after playing said pre-recorded audio message to said caller and recording any message said caller chooses to leave.

5. A cell phone apparatus which has software therein to monitor a Busy key, said software being designed to control said cell phone to respond to X presses or touches of a Busy key within Y seconds by a user of said cell phone of said Busy key, where X and Y are predetermined variables, by automatically launching a process to determine if said cell phone has just received a Short Message Service text message or is receiving a text message at the time said Busy key is pushed or touched X times within Y seconds or is receiving an incoming cellular phone call at the time said Busy key is pushed or touched X times within Y seconds, and, if a text message has been received or is being received, respond thereto by sending a pre-typed text message to the sender of said text message just received via the Short Message Service Data Channel, and, if an incoming cellular telephone phone call is being received at the time said Busy key is pushed or touched X times within Y seconds, to respond thereto automatically by automatically answering said incoming cellular call and automatically playing a pre-recorded audio message to said caller and/or automatically sending a predetermined text message to said caller.

* * * * *

UNITED STATES PATENT AND TRADEMARK OFFICE
CERTIFICATE OF CORRECTION

| | | |
|---|---|---|
| PATENT NO. | : 8,364,183 B2 | Page 1 of 1 |
| APPLICATION NO. | : 13/373325 | |
| DATED | : January 29, 2013 | |
| INVENTOR(S) | : Julia Olincy and Ronald Craig Fish | |

It is certified that error appears in the above-identified patent and that said Letters Patent is hereby corrected as shown below:

In the Claims

AT COL. 27, LINE 20-21, DELETE "SENDER OF SAID TEXT MESSAGE" AND SUBSTITUTE "CALLER OF SAID CELLULAR PHONE CALL"

Signed and Sealed this
Sixteenth Day of December, 2014

Michelle K. Lee
*Deputy Director of the United States Patent and Trademark Office*